United States Patent
Kim et al.

(10) Patent No.: US 9,554,053 B1
(45) Date of Patent: Jan. 24, 2017

(54) METHOD AND PHOTOGRAPHING APPARATUS FOR CONTROLLING FUNCTION BASED ON GESTURE OF USER

(71) Applicant: SAMSUNG ELECTRONICS CO., LTD., Suwon-si, Gyeonggi-do (KR)

(72) Inventors: Young-sik Kim, Suwon-si (KR); Gun-woo Nam, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/941,945

(22) Filed: Nov. 16, 2015

(30) Foreign Application Priority Data

Jul. 15, 2015 (KR) .................. 10-2015-0100520

(51) Int. Cl.
  *H04N 5/232* (2006.01)
  *G03B 17/18* (2006.01)

(52) U.S. Cl.
  CPC ...... *H04N 5/23293* (2013.01); *H04N 5/23216* (2013.01)

(58) Field of Classification Search
  CPC ..... G03B 17/18; G03B 2217/18; G03B 17/20; H04N 5/23216
  See application file for complete search history.

(56) References Cited

U.S. PATENT DOCUMENTS

| | | | |
|---|---|---|---|
| 2010/0141826 | A1 | 6/2010 | Thorn |
| 2011/0249165 | A1 | 10/2011 | Churei |
| 2011/0267526 | A1* | 11/2011 | Ishihara ............ G03B 3/10 348/333.01 |
| 2013/0083228 | A1 | 4/2013 | Iwatani |
| 2014/0049677 | A1* | 2/2014 | Kawaguchi ........ H04N 5/23216 348/333.01 |
| 2014/0099994 | A1 | 4/2014 | Bishop et al. |
| 2015/0109510 | A1 | 4/2015 | Fujita et al. |

FOREIGN PATENT DOCUMENTS

| | | |
|---|---|---|
| JP | 09-098331 | 4/1997 |
| KR | 10-0815234 | 3/2008 |
| KR | 10-2013-0059681 | 6/2013 |

OTHER PUBLICATIONS

Search Report and Written Opinion mailed Apr. 15, 2016 in counterpart International Patent Application No. PCT/KR2015/012772.

* cited by examiner

*Primary Examiner* — W B Perkey
(74) *Attorney, Agent, or Firm* — Nixon & Vanderhye P.C.

(57) ABSTRACT

A photographing apparatus including a sensor, a touchscreen, and a controller is disclosed. The sensor is configured to detect that a user approaches or comes within a predetermined proximity the photographing apparatus. The touchscreen is configured to display an image representing a state of the photographing apparatus and receive a gesture of the user. The controller is configured to enable a function of the touchscreen to detect the gesture based on a signal received from the sensor, and execute a function corresponding to the gesture.

19 Claims, 20 Drawing Sheets

FIG. 7
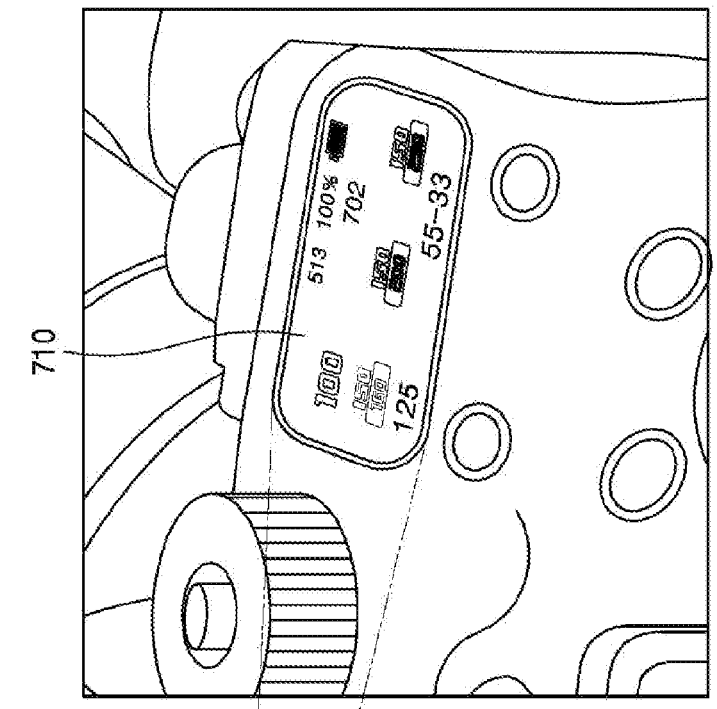
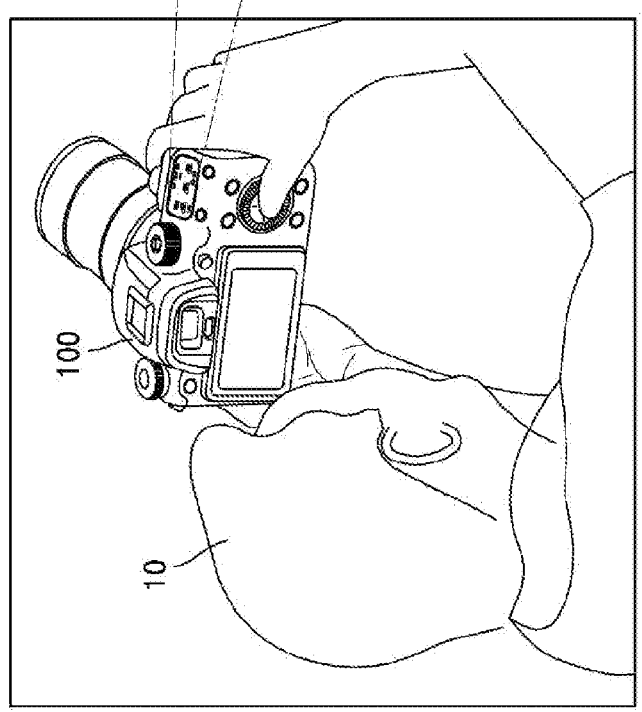

METHOD AND PHOTOGRAPHING APPARATUS FOR CONTROLLING FUNCTION BASED ON GESTURE OF USER

CROSS-REFERENCE TO RELATED APPLICATION

This application is based on and claims priority under 35 U.S.C. §119 to Korean Patent Application No. 10-2015-0100520, filed on Jul. 15, 2015, in the Korean Intellectual Property Office, the disclosure of which is incorporated by reference herein in its entirety.

BACKGROUND

1. Field

The disclosure relates to a method and photographing apparatus for controlling a function based on a gesture of a user.

2. Description of Related Art

With the development of technology related to photographing apparatuses, photographing apparatuses capable of capturing high-quality images have been developed. However, in the case where a user takes a picture by using a viewfinder, since the user may not use touch, key, or wheel input devices provided at a rear side of the photographing apparatus, it is difficult for the user to control the photographing apparatus.

Also, with the development of touchscreen technology, there is an increasing demand for technology capable of performing various functions based on gestures that are input onto a screen of the photographing apparatus by the user.

SUMMARY

A method and a photographing apparatus for controlling a function of the apparatus based on a gesture of a user are provided.

A non-transitory computer-readable recording medium that stores a program that, when executed, performs the above method is also provided.

Additional aspects will be set forth in part in the description which follows and, in part, will be apparent from the description.

According to an aspect of an example embodiment, a photographing apparatus includes: a sensor configured to detect that a user approaches, e.g., comes within a predetermined proximity to the photographing apparatus; a touchscreen configured to display an image representing a state of the photographing apparatus and to receive a gesture of the user; and a controller configured to enable a function of the touchscreen to detect the gesture based on a signal received from the sensor, and to perform a function corresponding to the gesture.

The controller may be configured to enable the function of detecting the gesture based on the signal received from the sensor while the image representing the state of the photographing apparatus is displayed.

The photographing apparatus may further include a viewfinder, wherein the sensor may detect whether the user approaches the viewfinder.

The controller may be configured to display an image representing a function performed by the photographing apparatus on the viewfinder.

The controller may be configured to set the function corresponding to the gesture based on a received input, such as, for example, a user input.

The function corresponding to the gesture may include a function of setting a photographing environment.

The function corresponding to the gesture may include a function of adjusting a position of a focus of an image.

The function corresponding to the gesture may include a function of executing an application installed in the photographing apparatus.

The image representing the state of the photographing apparatus may include at least one of information about a currently-set function and information representing a state of a battery.

According to an aspect of another example embodiment, a method of controlling a photographing apparatus includes: determining whether a user approaches the photographing apparatus; detecting a gesture of the user when the user approaches the photographing apparatus; and performing a function corresponding to the gesture when the gesture is detected.

The method may further include displaying an image representing a state of the photographing apparatus, wherein determining whether the user approaches the photographing apparatus may include determining whether the user approaches the photographing apparatus while the image is displayed.

Determining whether the user approaches the photographing apparatus may include determining whether the user approaches a viewfinder included in the photographing apparatus.

The method may further include displaying an image representing a function performed by the photographing apparatus on the viewfinder.

The method may further include setting the function corresponding to the gesture based on a received input, such as, for example, a user input.

The function corresponding to the gesture may include a function of setting a photographing environment.

The function corresponding to the gesture may include a function of adjusting a position of a focus of an image.

The function corresponding to the gesture may include a function of executing an application installed in the photographing apparatus.

The image representing the state of the photographing apparatus may include at least one of information about a currently-set function and information representing a state of a battery.

According to an aspect of another example embodiment, a non-transitory computer-readable recording medium stores a program that performs the above method when executed by a computer.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 7 is a diagram illustrating a state of a screen receiving a gesture;

DETAILED DESCRIPTION

Figure 1:
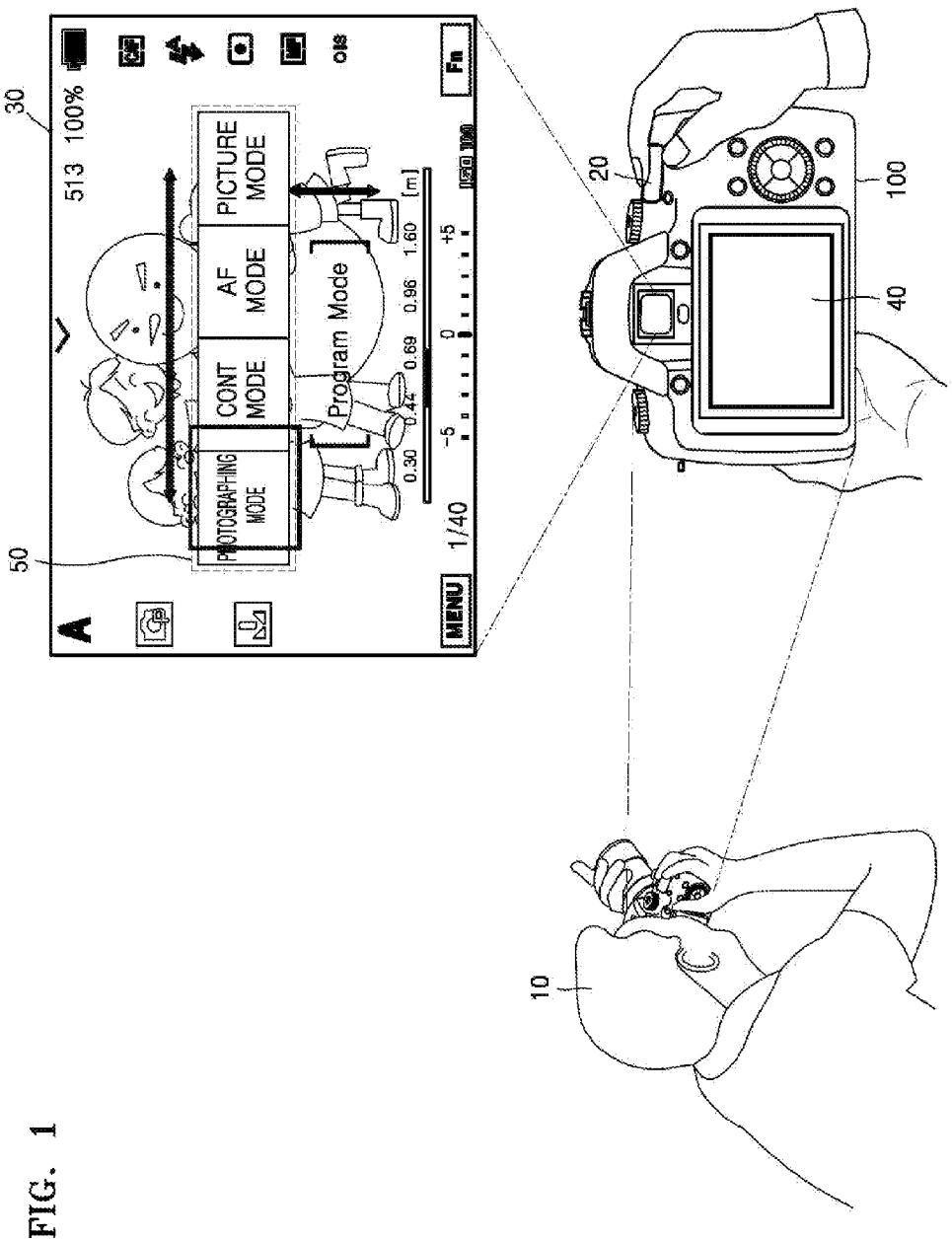
FIG. 1 is a diagram illustrating an example of a method of controlling a photographing apparatus.

Reference will now be made to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are illustratively described below, by referring to the figures, to explain various features. As used herein, the term "and/or" includes any and all combinations of one or more of the associated listed items. Expressions such as "at least one of," when preceding a list of elements, modify the entire list of elements and do not necessarily modify the individual elements of the list.

Hereinafter, example embodiments will be described with reference to the accompanying drawings. The example embodiments described below should be considered in a descriptive sense only and not for purposes of limitation. Therefore, the scope of the disclosure should be interpreted as also including those that may be readily derived from the disclosure by those of ordinary skill in the art.

When something "includes" a component, another component may be further included unless specified otherwise. Also, the term "unit" used herein refers to a software component or a hardware component such as electrical and/or digital circuitry, a field-programmable gate array (FPGA) or an application-specific integrated circuit (ASIC), and the "unit" performs some functions. However, the "unit" is not limited to software or hardware. The "unit" may be formed so as to be in an addressable storage medium, or may be formed so as to operate one or more processors. Thus, for example, the "unit" may include components such as software components, hardware components, object-oriented software components, class components, and task components, and may include processes, functions, attributes, procedures, subroutines, segments of program code, drivers, firmware, microcodes, circuits, data, a database, data structures, tables, arrays, and variables. A function provided by the components and "units" may be associated with the smaller number of components and "units", or may be divided into additional components and "units".

The term "gesture" may refer to a hand gesture of a user. For example, the gesture described herein may include a Tap, Touch & Hold, Double Tap, Drag, Panning, Flick, Drag & Drop, etc.

"Tap" may, for example, refer to an operation of touching a screen very quickly with a finger or a touch tool (stylus). For example, "Tap" may correspond to the case where there is a very small difference between a touch-in time point at which a finger or a touch tool touches a screen, and a touch-out time point at which the finger or the touch tool is separated from the screen.

"Touch & Hold" may, for example, refer to an operation of touching the screen with a finger or a touch tool and then holding the touch input for a critical time or more. For example, "Touch & Hold" may correspond to the case where a time difference between a touch-in time point and a touch-out time point is equal to or greater than the critical time. When the touch input is held for the critical time or more, a visual or auditory feedback signal may be provided so that the user may recognize whether the touch input is "Tap" or "Touch & Hold".

"Double Tap" may, for example, refer to an operation of touching the screen with a finger or a touch tool successively two times.

"Drag" may, for example, refer to an operation of touching the screen with a finger or a touch tool and then shifting the finger or the touch tool to another position on the screen while maintaining the touch. By performing a drag operation, an object (e.g., an image included in a thumbnail image) may be shifted, or a panning operation, or the like, which is described below, may be performed.

"Panning" may, for example, refer to an operation that performs a drag operation without selecting an object. Since "Panning" does not involve selecting an object, an interactive screen shifts to a next page or an object group shifts within the interactive screen, instead of the object being shifted within the interactive screen.

"Flick" may, for example, refer to an operation of dragging very quickly with a finger or a touch tool. "Drag (or Panning)" may, for example, be discriminated from "Flick" based on whether the shift speed of the finger or the touch tool is higher than a critical speed.

"Drag & Drop" may, for example, refer to an operation of dragging and dropping an object to a predetermined position on the screen with a finger or a touch tool.

FIG. 1 is a diagram illustrating an example of a method of controlling a photographing apparatus.

Referring to FIG. 1, a photographing apparatus 100 enables a function of a screen 20 to detect a gesture of the user based on whether a user 10 approaches the photographing apparatus 100. For example, when the user 10 approaches the photographing apparatus 100, the screen 20 detects a gesture of the user. Then, the photographing apparatus 100 executes a function corresponding to the gesture of the user. In the following disclosure, the term approaches may, for example, include coming within a predetermined range or proximity of a given object. As such, the terms approaches and comes within a predetermined range or proximity or views an object through a viewfinder, or the like may be used interchangeably.

In this case, the screen 20 may, for example, display an image representing a state of the photographing apparatus 100. The image representing the state of the photographing apparatus 100 may, for example, refer to information about a currently-set function of the photographing apparatus 100 or information representing a state of a battery of the photographing apparatus 100. For example, the screen 20 may display information about a set ISO sensitivity of the photographing apparatus 100, a set aperture value, and a remaining battery level.

In general, the user 10 sets a function of the photographing apparatus 100 by using a button or a wheel included in the photographing apparatus 100. For example, the user 10 detects a function of the photographing apparatus 100 through a screen 40 displaying a live view image and sets the details of the function by using the button or the wheel. Thus, when the user 10 views a target object, which will be photographed, through a viewfinder 30, the user 10 may not select a desired function or set the details of a selected function.

The photographing apparatus 100 determines whether the user 10 approaches the photographing apparatus 100. For example, the photographing apparatus 100 may detect the approach of the user 10 to the photographing apparatus 100 using a sensor. The approach of the user 10 to the photographing apparatus 100 may, for example, refer to, but is not limited to, the case where the user 10 views the target object through the viewfinder 30.

When the user 10 approaches the photographing apparatus 100, the photographing apparatus 100 may detect a gesture of the user 10 through the screen 20. For example, the user 10 may perform various gestures by touching the screen 20, and the photographing apparatus 100 may identify the gesture of the user. Then, the photographing apparatus 100 may execute a function selected based on the gesture of the user 10.

In this case, the viewfinder 30 may display a menu 50 representing functions that may be executed by the photographing apparatus 100. For example, when the user 10 touches the screen 20 while staring the target object through the viewfinder 30, the viewfinder 30 may display the menu 50. Thus, by performing a gesture, the user 10 may select any one of the functions represented by the menu 50 and may set the details of the selected function.

As described above, even while staring the target object through the viewfinder 30, the user 10 may select the function of the photographing apparatus 100 or set the details of the selected function. Thus, the user 10 may easily perform a photographing operation based on information displayed in the viewfinder 30.

Although FIG. 1 illustrates that the photographing apparatus 100 executes a function based on the gesture input through the screen 20, the disclosure is not limited thereto. As an example, when the user performs a gesture by touching the screen 40 while approaching the photographing apparatus 100, the photographing apparatus 100 may identify the gesture and execute a function corresponding to the identified gesture.

Also, an image captured by the photographing apparatus 100 may, for example, be a still image or a moving image.

Examples of the photographing apparatus 100 will be described below with reference to FIGS. 2 and 3.

Figure 2:
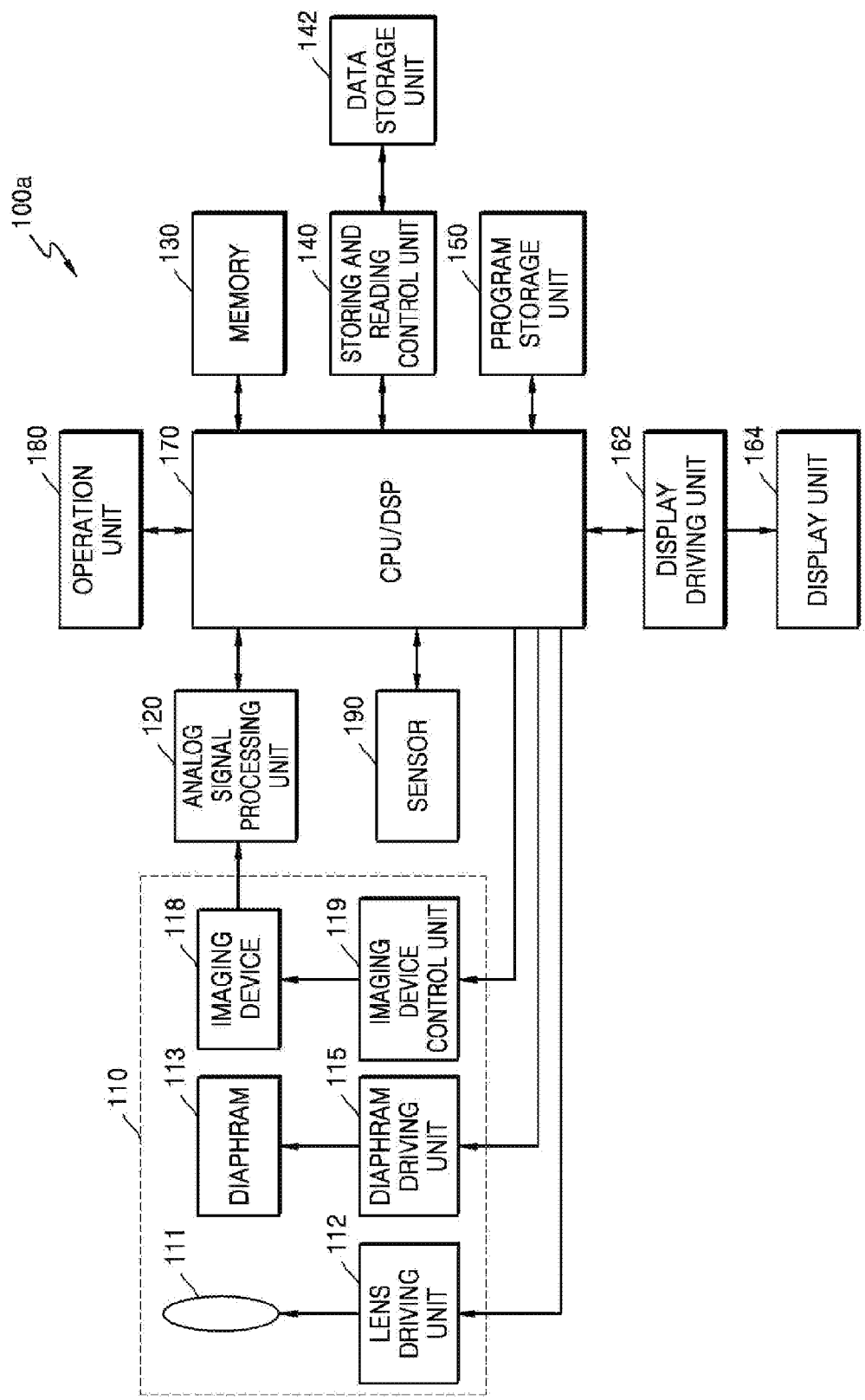
FIG. 2 is a block diagram illustrating an example of a photographing apparatus.

FIG. 2 is a block diagram illustrating an example of a photographing apparatus.

Referring to FIG. 2, a photographing apparatus 100a may include a photographing unit 110, an analog signal processing unit 120, a memory 130, a storage/read control unit 140, a data storage unit 142, a program storage unit 150, a display driving unit 162, a display unit 164, a central processing unit (CPU)/digital signal processor (DSP) 170, and an operation unit 180.

An overall operation of the photographing apparatus 100a may, for example, be controlled by the CPU/DSP 170. In FIGS. 4 to 19, the CPU/DSP 170 may be referred to as a controller. The CPU/DSP 170 may be configured to provide a control signal for operating each component included in the photographing apparatus 100a, such as a lens driving unit 112, a diaphragm driving unit 115, an imaging device control unit 119, the display driving unit 162, and the operation unit 180.

The photographing unit 110 may generate an image from an electrical signal generated based on incident light, and may include a lens 111, the lens driving unit 112, a diaphragm 113, the diaphragm driving unit 115, an imaging device 118, and the imaging device control unit 119.

The lens 111 may include a group of lenses. The position of the lens 111 may be adjusted by the lens driving unit 112. The lens driving unit 112 may adjust the position of the lens 111 based on a control signal provided by the CPU/DSP 170.

The opening degree of the diaphragm 113 may be adjusted by the diaphragm driving unit 115 to adjust the quantity of light that is incident on the imaging device 118.

An optical signal, which has penetrated the lens 111 and the diaphragm 113, forms an image of a subject at a light-receiving surface of the imaging device 118. The imaging device 118 may, for example, include a charge coupled device (CCD) image sensor or a complementary metal-oxide-semiconductor image sensor (CIS), or the like, that converts an optical signal into an electrical signal. The sensitivity of the imaging device 118 may be adjusted by the imaging device control unit 119. The imaging device control unit 119 may be configured to control the imaging device 118 based on a control signal that is automatically generated by an image signal that is input in real time, or based on a control signal that is manually input, for example, by a user's operation.

An exposure time of the imaging device 118 may be adjusted by a shutter (not illustrated). Examples of the shutter may include a mechanical shutter that controls the incidence of light by shifting a shield, and an electronic shutter that controls exposure by supplying an electrical signal to the imaging device 118.

The analog signal processing unit 120 may, for example, be configured to perform a noise reduction operation, a gain control operation, a waveform shaping operation, and an analog-to-digital conversion operation, or the like, on an analog signal supplied from the imaging device 118.

The signal processed by the analog signal processing unit 120 may be input to the CPU/DSP 170 through the memory 130, or may be input to the CPU/DSP 170 without passing through the memory 130. The memory 130 may, for example, operate as a main memory of the photographing apparatus 100a, and may temporarily store necessary information during the operation of the CPU/DSP 170. The program storage unit 150 may, for example, store programs for an application system and an operating system for operating the photographing apparatus 100a.

Also, the photographing apparatus 100a may include the display unit 164 for displaying an operation state of the photographing apparatus 100a and image information captured by the photographing apparatus 100a. The display unit 164 may provide visual information and/or aural information to the user. In order to provide visual information, the display unit 164 may include, for example, a liquid crystal display (LCD) panel or an organic light-emitting display (OLED) panel, or the like.

Also, the photographing apparatus 100a may include two or more display units 164, which may include a touchscreen that may detect a touch input. For example, the photographing apparatus 100a may include a display unit for displaying a live view image representing a target object to be photographed, and a display unit for displaying an image representing the state of the photographing apparatus 100a.

The display driving unit 162 may provide a driving signal to the display unit 164.

The CPU/DSP 170 may be configured to process an input image signal and to control the respective component units based on an external input signal. The CPU/DSP 170 may be configured to reduce noise in input image data and may be configured to perform image signal processing operations for image quality improvement, such as gamma correction, color filter array interpolation, color matrix, color correction, and color enhancement. Also, the CPU/DSP 170 may be configured to generate an image file by compressing the image data generated by the image signal processing operations for image quality improvement, or may be configured to restore the image data from the image file. An image compression format may, for example, be a reversible format or an irreversible format. In the case of a still image, examples of the image compression format may, for example, include a Joint Photographic Experts Group (JPEG) format and a JPEG 2000 format. Also, in the case of recording a moving image, a moving image file may be generated by compressing a plurality of frames according to the Moving Picture Experts Group (MPEG) standard.

The image data output from the CPU/DSP 170 may, for example, be input to the storage/read control unit 140 directly or through the memory 130, and the storage/read control unit 140 may store the image data in the data storage unit 142 automatically or based on a signal from the user. Also, the storage/read control unit 140 may read the image data from the image file stored in the data storage unit 142 and input the read image data to the display driving unit through the memory 130 or another path so that an image may be displayed on the display unit 164. The data storage unit 142 may be detachable or may be permanently attached to the photographing apparatus 100a.

Also, the CPU/DSP 170 may be configured to perform functions such as obscuring, coloring, blurring, edge emphasis, image interpretation, image recognition, and image effects. As examples of the image recognition, face recognition or scene recognition may be performed. Also, the CPU/DSP 170 may be configured to perform display image signal processing for a display operation on the display unit 164. For example, the CPU/DSP 170 may be configured to perform luminance level adjustment, color correction, contrast adjustment, outline emphasis adjustment, screen division, character image generation, and image synthesis. The CPU/DSP 170 may be connected to an external monitor to perform image signal processing for a display operation on the external monitor, and the processed image data may be transmitted so that the relevant image may be displayed on the external monitor.

Also, by executing a program stored in the program storage unit 150 or by having a separate module, the CPU/DSP 170 may be configured to generate control signals for controlling auto focusing, zoom change, focus change, and automatic exposure correction, to provide the control signals to the diaphragm driving unit 115, the lens driving unit 112, and the imaging device control unit 119, and to control the overall operations of the components included in the photographing apparatus 100a, such as a shutter and a stroboscope.

The operation unit 180 may be used to input a control signal. The operation unit 180 may include various function buttons such as a shutter release button for inputting a shutter release signal for photographing by exposing the imaging device 118 to light for a predetermined time, a power button for inputting a control signal for controlling power on/off, a zoom button for increasing or decreasing a viewing angle according to an input, a mode selection button, and other photographing setting value adjustment buttons. The operation unit 180 may be implemented by any type of input unit, such as a button, a keyboard, a touch pad, a touchscreen, or a remote controller, that enables the input of a control signal.

The sensor 190 may, for example, measure a physical parameter or detect an operation state of the photographing apparatus 100a and convert the measured or detected information into an electrical signal. An example of the sensor 190 included in the photographing apparatus 100a will be described below with reference to FIG. 3. The sensor 190 may further include a control circuit configured to control one or more sensors included therein. In some examples, the photographing apparatus 100a may further include a processor, which is configured separately or as a portion of the CPU/DSP 170 to control the sensor 190, to control the sensor 190 while the CPU/DSP 170 is in a sleep state.

The photographing apparatus 100a illustrated in FIG. 2 is merely an example, and the disclosure is not limited thereto. Another example of the photographing apparatus 100 will be described below with reference to FIG. 3.

Figure 3:
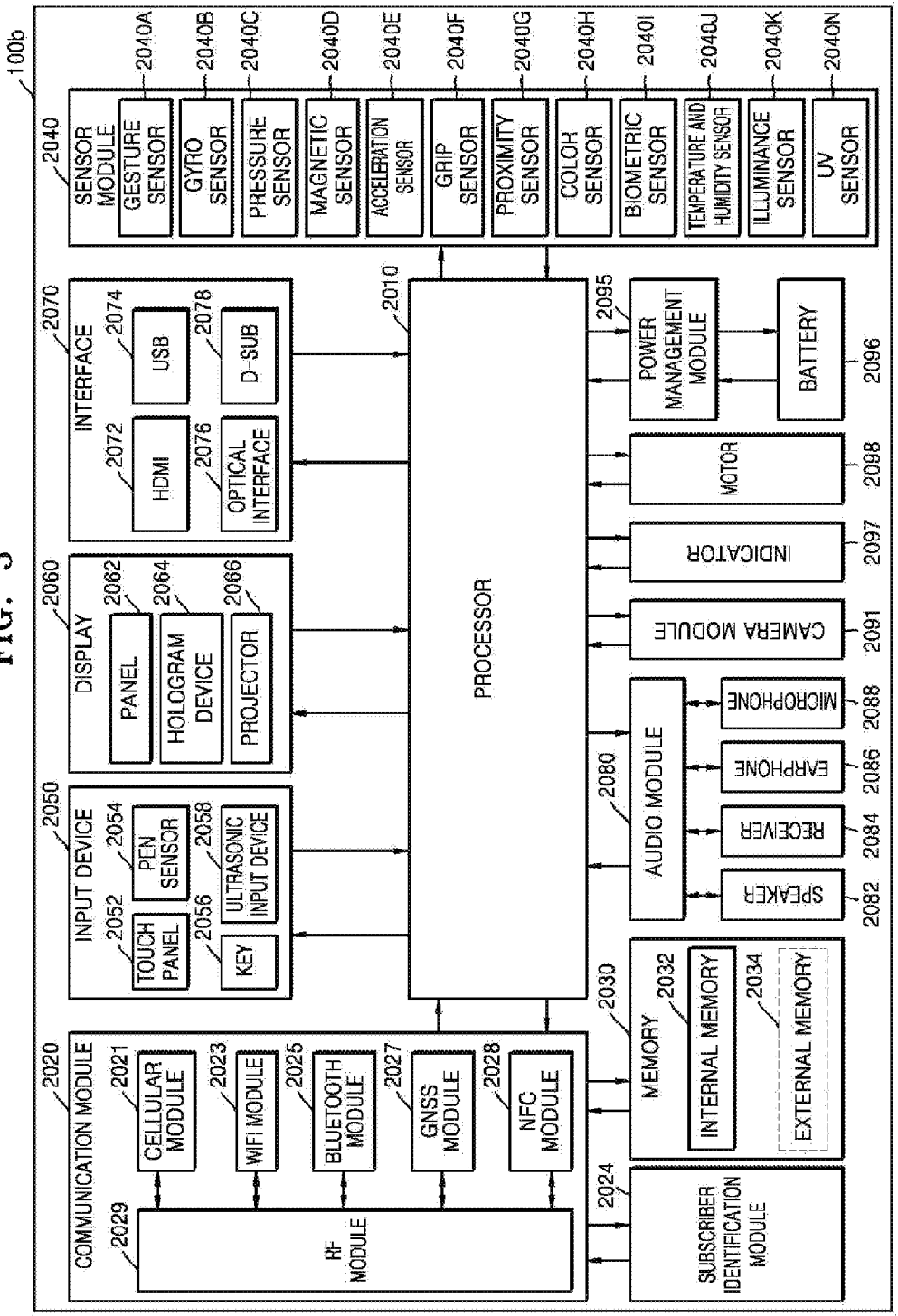
FIG. 3 is a block diagram illustrating another example of a photographing apparatus.

FIG. 3 is a block diagram illustrating another example of a photographing apparatus.

Referring to FIG. 3, a photographing apparatus 100b may include, for example, all or some of the photographing apparatus 100 illustrated in FIG. 1. The photographing apparatus 100b may, for example, include at least one processor (e.g., CPU/DSP or application processor (AP)) 2010, a communication module 2020, a subscriber identification module (SIM) 2024, a memory 2030, a sensor module 2040, an input device 2050, a display 2060, an interface 2070, an audio module 2080, a camera module 2091, a power management module 2095, a battery 2096, an indicator 2097, and a motor 2098.

For example, by driving an operating system (OS) or an application program, the processor 2010 may be configured to control a plurality of hardware or software components connected to the processor 2010 and to perform various data processing and operations. The processor 2010 may be implemented, for example, as a system on chip (SoC). According to an example, the processor 2010 may include a graphic processing unit (GPU) and/or an image signal processor (ISP). The processor 2010 may include at least some (e.g., a cellular module 2021) of the components illustrated in FIG. 3. The processor 2010 may load a command or data received from at least one of other components (e.g., a nonvolatile memory) into a volatile memory and process the loaded data, and the processor 2010 may store various data in the nonvolatile memory.

The communication module 2020 may include various communication circuitry, for example, the cellular module 2021, a wireless fidelity (WiFi) module 2023, a Bluetooth (BT) module 1025, a Global Navigation Satellite System (GNSS) module 2027 (e.g., a GPS module, a GLONASS module, a BeiDou module, or a Galileo module), a near field communication (NFC) module 2028, and a radio frequency (RF) module 2029.

The cellular module 2021 may provide, for example, a voice call service, a video call service, a text message service, or an Internet service through a communication network. According to an example, the cellular module 2021 may identify and authenticate the photographing apparatus 100b in the communication network using the subscriber identification module 2024 (e.g., a SIM card). According to an example, the cellular module 2021 may perform at least some of the functions that may be provided by the processor 2010. According to an example, the cellular module 1021 may include a communication processor (CP).

Each of the WiFi module 2023, the BT module 2025, the GNSS module 2027, and the NFC module 2028 may include, for example, a processor for processing data transmitted/received through the corresponding module. According to various examples, at least some (e.g., two or more) of the cellular module 2021, the WiFi module 2023, the BT module 2025, the GNSS module 2027, and the NFC module 2028 may be included in an integrated chip (IC) or an IC package.

The RF module 2029 may transmit/receive, for example, a communication signal (e.g., an RF signal). The RF module 2029 may include, for example, a transceiver, a power amplifier module (PAM), a low noise amplifier (LNA), or an antenna. According to another example, at least one of the cellular module 2021, the WiFi module 2023, the BT module 2025, the GNSS module 2027, and the NFC module 2028 may transmit/receive an RF signal through a separate RF module.

For example, the subscriber identification module 2024 may include an embedded SIM and/or a card including a subscriber identification module, and may include unique identification information (e.g., an integrated circuit card identifier (ICCID)) or subscriber information (e.g., an international mobile subscriber identity (MO)).

The memory 2030 may include, for example, an internal memory 2032 and/or an external memory 2034. The internal memory 2032 may include, for example, at least one of a volatile memory (e.g., a dynamic RAM (DRAM), a static RAM (SRAM), or a synchronous dynamic RAM (SDRAM)) and a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, or a solid state drive (SSD)).

The external memory 2034 may include, for example, a flash drive such as compact flash (CF), secure digital (SD), micro secure digital (Micro-SD), mini secure digital (Mini-SD), extreme digital (xD), a multimedia card (MMC), or a memory stick. The external memory 2034 may be operatively and/or physically connected to the photographing apparatus 100b through various interfaces.

For example, the sensor module 2040 may measure a physical parameter or detect an operation state of the photographing apparatus 100b and convert the measured or detected information into an electrical signal. The sensor module 2040 may include, for example, at least one of a gesture sensor 2040A, a gyro sensor 2040B, a pressure sensor 2040C, a magnetic sensor 2040D, an acceleration sensor 2040E, a grip sensor 2040F, a proximity sensor 2040G, a color sensor 2040H (e.g., an RGB (Red, Green, Blue) sensor), a biometric sensor 2040I, a temperature/humidity sensor 2040J, an illumination sensor 2040K, and an ultraviolet sensor 2040M. Additionally or alternatively, the sensor module 2040 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor (not shown). The sensor module 2040 may further include a control circuit configured to control one or more of the sensors included therein. In some examples, the photographing apparatus 100b may further include a processor, which is configured separately or as a portion of the processor 2010 to control the sensor module 2040, and to control the sensor module 2040 while the processor 2010 is in a sleep state.

The input device 2050 may include, for example, a touch panel 2052, a (digital) pen sensor 2054, a key 2056, or an ultrasonic input device 2058. The touch panel 2052 may include, for example, at least one of a capacitive type, a resistive type, an infrared type, and an ultrasonic type. Also, the touch panel 2052 may further include a control circuit. The touch panel 2052 may further include a tactile layer to provide a haptic reaction to the user.

For example, the (digital) pen sensor 2054 may be a portion of the touch panel or may include a separate recognition sheet. The key 2056 may include, for example, a physical key, an optical key, or a keypad, or the like. The ultrasonic input device 2058 may detect an ultrasonic wave generated by an input tool through a microphone (e.g., a microphone 2088) and detect data corresponding to the detected ultrasonic wave.

The display 2060 (e.g., the display unit 164) may include a panel 2062, a hologram device 2064, and/or a projector 2066. For example, the panel 2062 may be implemented to be flexible, transparent, or wearable. The panel 2062 may be integrated with the touch panel 2052 into one module. The hologram device 2064 may display a stereoscopic image in the air using light interference. The projector 2066 may display an image by projecting light onto a screen. For example, the screen may be located inside or outside the photographing apparatus 100b. According to an example, the display 2060 may further include a control circuit configured to control the panel 2062, the hologram device 2064, and/or the projector 2066.

The interface 2070 may include, for example, a high-definition multimedia interface (HDMI) 2072, a universal serial bus (USB) 2074, an optical interface 2076, and/or a D-subminiature (D-SUB) 2078. Additionally or alternatively, the interface 2070 may include, for example, a mobile high-definition link (MHL) interface, a secure digital (SD) card/multimedia card (MMC) interface, or an infrared data association (IrDA) standard interface (not shown).

For example, the audio module 2080 may convert a sound into an electrical signal and an electrical signal into a sound. For example, the audio module 2080 may process sound information that is input or output through a speaker 2082, a receiver 2084, an earphone 2086, or a microphone 2088.

For example, the camera module 2091 may capture a still image and/or a moving image. According to an example, the camera module 2091 may include one or more image sensors (e.g., a front sensor or a rear sensor), a lens, an image signal processor (ISP), or a flash (e.g., an LED or a xenon lamp).

For example, the power management module 2095 may manage the power of the photographing apparatus 100*b*. According to an example, the power management module 2095 may include a power management integrated circuit (PMIC), a charger integrated circuit (IC), or a battery or fuel gauge. The PMIC may have a wired and/or wireless charge mode. For example, the wireless charge mode may include a magnetic resonance mode, a magnetic induction mode, or an electromagnetic wave mode and may further include an additional wireless charge circuit such as a coil loop, a resonant circuit, or a rectifier. For example, the battery gauge may measure the residual capacity, charge voltage, current, or temperature of the battery 2096. The battery 2096 may include, for example, a rechargeable battery and/or a solar battery.

The indicator 2097 may indicate a particular state of the photographing apparatus 100*b* or a portion thereof (e.g., the processor 2010), such as a booting state, a message state, or a charge state. The motor 2098 may convert an electrical signal into a mechanical vibration and may generate a vibration or a haptic effect. Although not illustrated in FIG. 3, the photographing apparatus 100*b* may include a processing device (e.g., a GPU) for supporting a mobile TV. For example, the processing device for supporting a mobile TV may process media data based on standards such as digital multimedia broadcasting (DMB), digital video broadcasting (DVB), or MediaFLO™.

Each of the components described herein may include one or more components, and the name of each component may vary based on the type of the electronic apparatus. In various examples, the electronic apparatus may include at least one of the components described herein, and some components may be omitted from the electronic apparatus or additional other components may be further included in the electronic apparatus. Also, some of the components of the electronic apparatus according to various examples may be combined into one entity to perform the same functions as the corresponding components prior to combination.

Figure 4A:
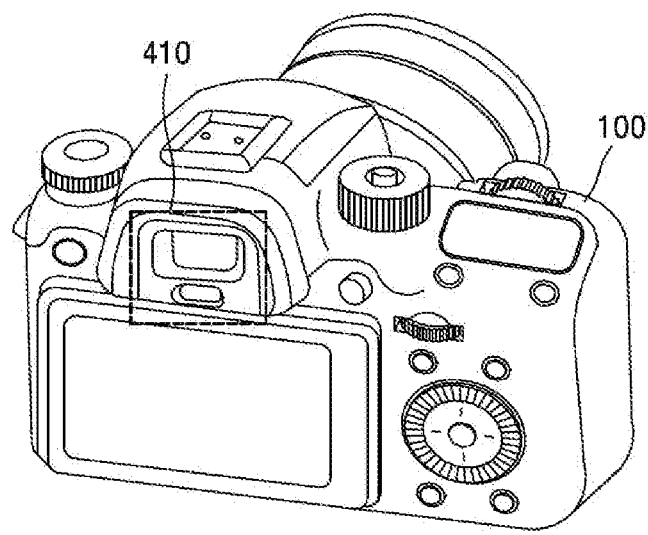
FIGS. 4A and 4B are diagrams illustrating an example of a viewfinder.
Figure 4B:
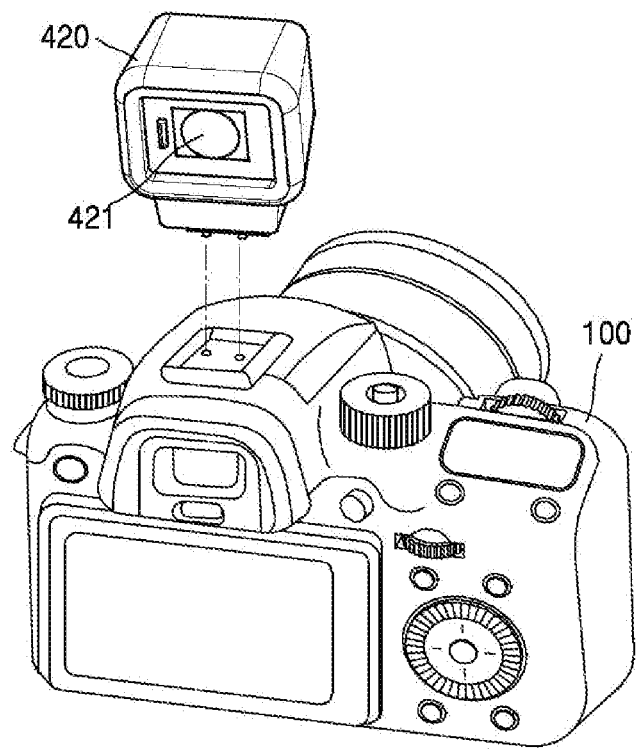

FIGS. 4A and 4B are diagrams illustrating an example of a viewfinder.

FIG. 4A illustrates an example of a viewfinder 410 included in the photographing apparatus 100. The viewfinder 410 may be included in the photographing apparatus 100. As an example, the viewfinder 410 may be fabricated to be attachable/detachable to/from the photographing apparatus 100.

The viewfinder 410 may, for example, refer to a device that is looked through to take a picture or to focus. For example, the viewfinder 410 may be implemented by an optical viewfinder (OVF) or an electronic viewfinder (EVF). The OVF may refer to a device that shows an image to the user 10 by reflecting an image input through a lens of the photographing apparatus 100 by a mirror based, for example, on the principle of telescopes. The EVF may refer to a device that displays an image input through a lens on an LCD panel or an OLED panel.

The user 10 may view a target object, which is to be photographed, through the viewfinder 410 and may capture an image including the target object by adjusting the composition or focus thereof.

FIG. 4B illustrates an example of a viewfinder 420 that is detachable from the photographing apparatus 100. As an example, the viewfinder 420 may be implemented as a device that is independent from the photographing apparatus 100, and the user 10 may use the viewfinder 420 in combination with the photographing apparatus 100.

In this case, a portion including a lens 421 in the viewfinder 420, through which the user 10 looks, may be adjusted to enable viewing in various directions. Thus, the user 10 may capture an image while viewing various angles.

Examples of executing a function corresponding to a gesture of the user by the photographing apparatus 100 will be described below with reference to FIGS. 5 and 17.

Figure 5:
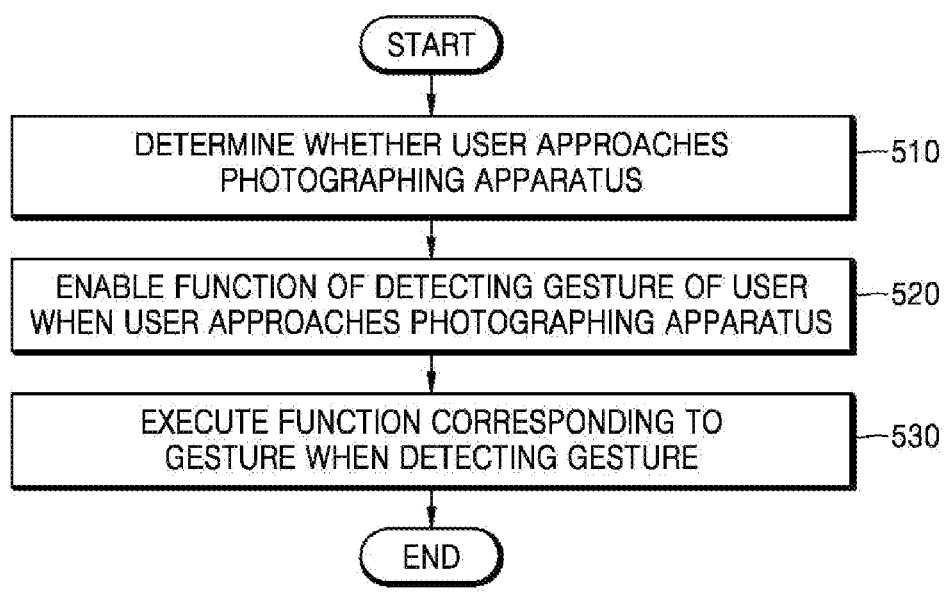
FIG. 5 is a flowchart illustrating an example of a method of controlling a photographing apparatus.

FIG. 5 is a flowchart illustrating an example of a method of controlling a photographing apparatus.

Referring to FIG. 5, the photographing apparatus control method may include sequential operations that are sequentially processed in the photographing apparatus 100 illustrated in FIGS. 1 to 4. Thus, although omitted, the above descriptions about the photographing apparatus 100 illustrated in FIGS. 1 to 4 may also be applied to the photographing apparatus control method of FIG. 5.

In operation 510, the photographing apparatus 100 may determine whether the user approaches the photographing apparatus 100. As an example, the photographing apparatus 100 may detect the approach of the user to the photographing apparatus 100. For example, the sensor 190 or the sensor module 2040 of the photographing apparatus 100 may detect the approach of the user to the photographing apparatus 100. The sensor 190 or the sensor module 2040 may include a proximity sensor but is not limited thereto.

An example of determining the approach of the user to the photographing apparatus 100 will be described below with reference to FIGS. 6A and 6B.

Figure 6A:
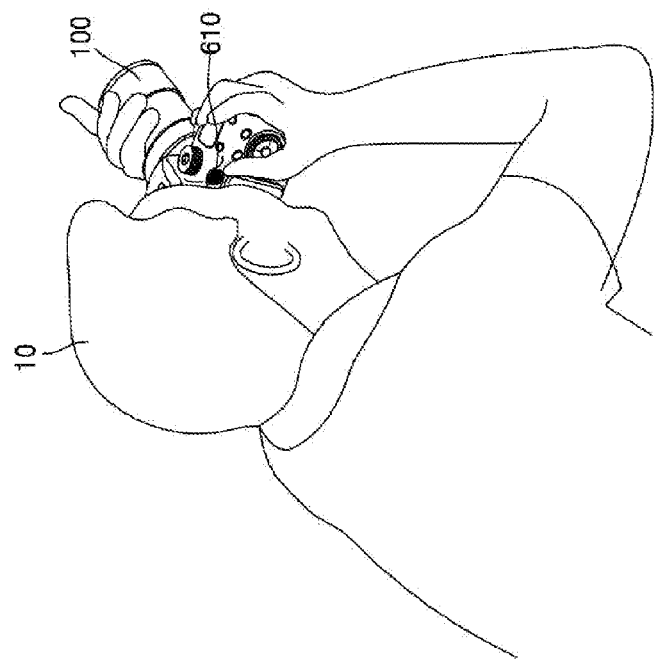
FIGS. 6A and 6B are diagrams illustrating an example of a photographing apparatus determining the approach of a user.
Figure 6B:
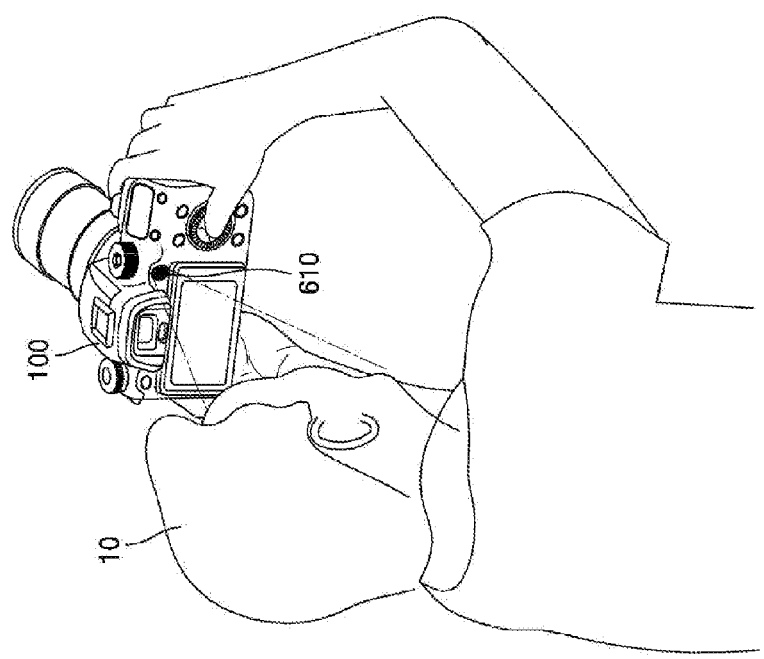

FIGS. 6A and 6B are diagrams illustrating an example of a photographing apparatus determining an approach of the user.

FIG. 6A illustrates an example in which the user 10 is spaced apart from the photographing apparatus 100 by a predetermined distance or more. A sensor 610 included in the photographing apparatus 100 may detect the approach of the user 10 to the photographing apparatus 100. For example, the sensor 610 may irradiate light to the outside of the photographing apparatus 100 and use a signal reflected from an object to detect the approach of the user 10 to the photographing apparatus 100.

For example, the sensor 610 may include a transmitting unit for irradiating light to outside thereof and a receiving unit for receiving a signal from the outside. The light may include an infrared light but is not limited thereto. For example, the transmitting unit of the sensor 610 may include a light source, and light generated from the light source may be irradiated to the user 10, e.g., the target object. Then, the receiving unit of the sensor 610 may acquire a signal reflected from the target object.

FIG. 6B illustrates an example in which the user 10 approaches the photographing apparatus 100. The photographing apparatus 100 may determine whether the user 10 approaches the photographing apparatus 100, based on the signal acquired by the receiving unit of the sensor 610. For example, based on the signal received from the sensor 610, the photographing apparatus 100 may determine whether the user 10 approaches the viewfinder of the photographing apparatus 100, such as, for example, by determining a proximity of a user.

As an example, the photographing apparatus 100 may measure the strength of the signal acquired by the receiving unit and determine the distance from the sensor 610 to the user 10. For example, the photographing apparatus 100 may compare the strength of the signal acquired by the receiving unit with a pre-stored mapping table and determine the distance from the photographing apparatus 100 to the user 10. Then, when the determined distance is smaller than a predetermined distance, the photographing apparatus 100 may determine that the user 10 approaches the photographing apparatus 100.

As another example, when the distance from the sensor 610 to the user 10 is smaller than a predetermined distance, the sensor 610 may transmit a signal indicating the approach of the user 10 to the photographing apparatus 100. For example, information about a signal amount or a signal strength corresponding to a predetermined distance may be pre-stored in the photographing apparatus 100, and the sensor 610 may compare the acquired signal with the pre-stored information to determine whether the distance from the sensor 610 to the user 10 is smaller than the predetermined distance. When the distance from the sensor 610 to the user 10 is smaller than the predetermined distance, the sensor 610 may transmit the signal indicating the approach of the user 10 to the photographing apparatus 100.

Referring to FIG. 5, in operation 520, when the user 10 approaches the photographing apparatus 100, the photographing apparatus 100 may be configured to enable a function of detecting a gesture of the user 10. As an example, when the user 10 approaches the photographing apparatus 100, the photographing apparatus 100 may receive a gesture of the user 10 through a screen included in the photographing apparatus 100. The screen may refer to, but is not limited to, a screen displaying an image representing the state of the photographing apparatus 100.

The photographing apparatus 100 may be configured to enable a function of the screen to detect a gesture of the user 10 based on the signal received from the sensor while displaying the image representing the state of the photographing apparatus 100 on the screen. As an example, when the photographing apparatus 100 is turned on, the photographing apparatus 100 may display the image representing the state of the photographing apparatus 100 on the screen. Thereafter, based on whether the user 10 approaches the photographing apparatus 100, the photographing apparatus 100 may be configured to enable the function of the screen to detect a gesture of the user 10 and may change the state of the screen (i.e., the image displayed on the screen).

An example of the screen receiving a gesture of the user 10 will be described below with reference to FIGS. 7 and 8.

FIG. 7 is a diagram illustrating a state of the screen that may receive a gesture.

FIG. 7 illustrates an example in which the user 10 is spaced apart from the photographing apparatus 100 by a predetermined distance or more.

Referring to FIG. 7, the photographing apparatus 100 may include a screen 710 displaying an image representing the state of the photographing apparatus 100. The image representing the state of the photographing apparatus 100 may refer to information about a currently-set function of the photographing apparatus 100 or information representing the state of a battery of the photographing apparatus 100. For example, the screen 710 may display information about a set ISO sensitivity of the photographing apparatus 100, a set aperture value, and a remaining battery level. Thus, through the screen 710, the user 10 may determine the current state of the photographing apparatus 100 and the current function set in the photographing apparatus 100.

When the user 10 is spaced apart from the photographing apparatus 100 by a predetermined distance or more, the photographing apparatus 100 may be configured to disable a function of the screen 710 to detect a gesture of the user. For example, the screen 710 may only function to display information and may not detect a gesture of the user 10. Thus, even when the user 10 performs a gesture such as a tap or a drag, the photographing apparatus 100 may not perform a function corresponding to the gesture.

Figure 8:
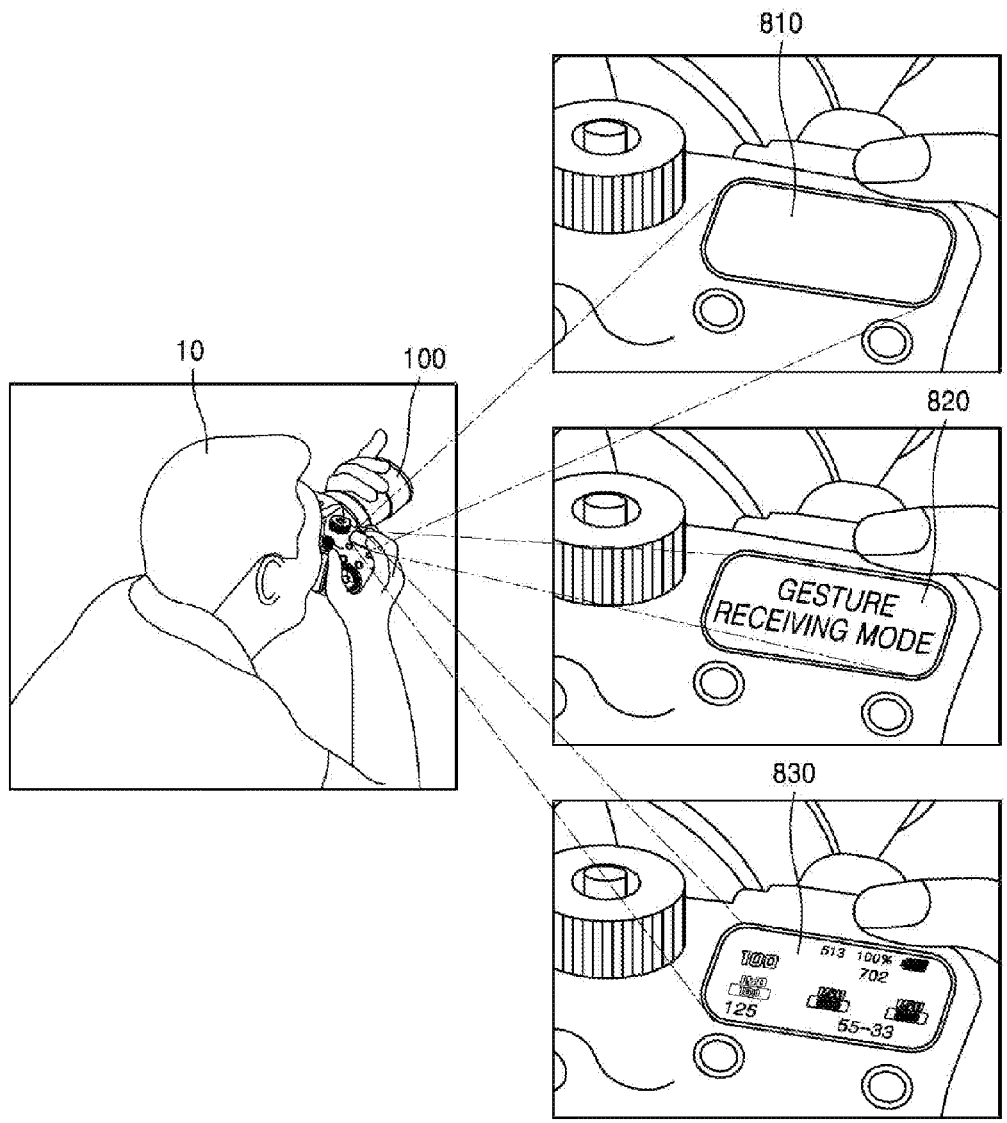
FIG. 8 is a diagram illustrating another state of a screen receiving a gesture.

FIG. 8 is a diagram illustrating another state of the screen receiving a gesture.

FIG. 8 illustrates an example in which the user 10 approaches the photographing apparatus 100.

Referring to FIG. 8, when the user 10 approaches the photographing apparatus 100, the photographing apparatus 100 may be configured to enable a function of a screen 810, 820, or 830 to detect a gesture of the user. As described above with reference to FIG. 7, when the user 10 does not approach the photographing apparatus 100, the screen 710 may not detect a gesture of the user. On the other hand, when the user 10 approaches the photographing apparatus 100, the screen 810, 820, or 830 may detect a gesture of the user. Thus, the photographing apparatus 100 may be configured to execute or perform a predetermined function based on the gesture of the user 10.

As described above with reference to FIG. 7, the screen 710 may display an image representing the state of the photographing apparatus 100. However, when the user 10 approaches the photographing apparatus 100, the screen 810, 820, or 830 may or may not display an image representing the state of the photographing apparatus 100.

As an example, the photographing apparatus 100 may not display any image on the screen 810. In other words, when the user 10 is spaced apart from the photographing apparatus 100 by a predetermined distance or more, the photographing apparatus 100 may display an image representing the state of the photographing apparatus 100 on the screen 810, and when the user 10 approaches the photographing apparatus 100, the photographing apparatus 100 may delete the image displayed on the screen 810.

As another example, the photographing apparatus 100 may display another image on the screen 820 based on whether the user 10 approaches the photographing apparatus 100. In other words, when the user 10 is spaced apart from the photographing apparatus 100 by a predetermined distance or more, the photographing apparatus 100 may display an image representing the state of the photographing apparatus 100 on the screen 820, and when the user 10 approaches the photographing apparatus 100, the photographing apparatus 100 may replace the image displayed on the screen 820 with an alternative image. As an example of the alternative image displayed on the screen 820, FIG. 8 illustrates an image indicating that a gesture of the user 10 may be detected. However, the alternative image displayed on the screen 820 is not limited to the image illustrated in FIG. 8, and may be any image that is different from the image pre-displayed on the screen 820.

As another example, even when the user 10 approaches the photographing apparatus 100, the photographing apparatus 100 may maintain the pre-displayed image representing the state of the photographing apparatus 100. In other words, regardless of whether the user 10 approaches the photographing apparatus 100, the photographing apparatus 100 may continuously display the image representing the state of the photographing apparatus 100 on the screen 830.

As described above with reference to FIG. 8, when the user 10 approaches the photographing apparatus 100, the states of the screens 810, 820, and 830 may vary. However, when the user 10 approaches the photographing apparatus 100, the screen 810, 820, or 830 may detect a gesture of the user 10 in a similar manner.

Referring to FIG. 5, in operation 530, the photographing apparatus 100 may be configured to execute or perform a function corresponding to the detected gesture. In other words, the photographing apparatus 100 may be configured to execute or perform a function selected based on the gesture of the user 10.

Operation 530 will be described below with reference to FIG. 9.

Figure 9:
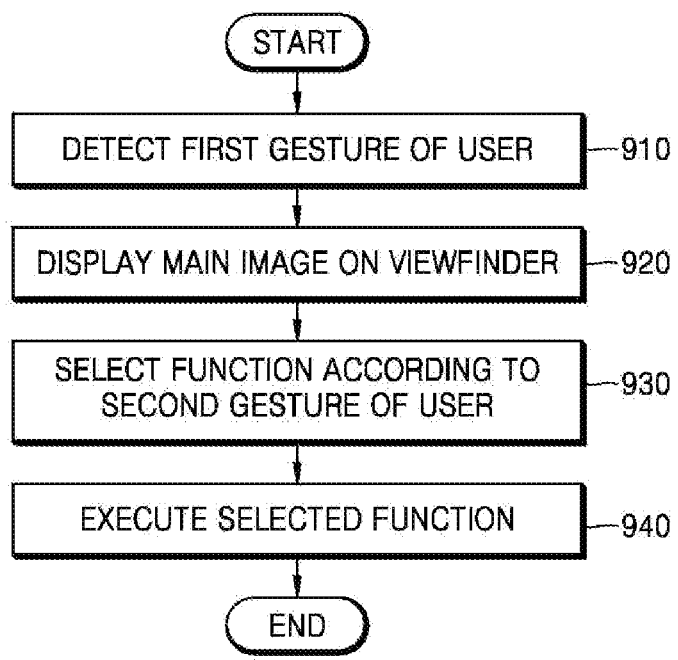
FIG. 9 is a flowchart illustrating an example of a photographing apparatus executing a function corresponding to a gesture.

FIG. 9 is a flowchart illustrating an example of a photographing apparatus executing a function corresponding to a gesture.

The flowchart illustrated in FIG. 9 may include sequential operations that are sequentially processed in the photographing apparatus 100 illustrated in FIGS. 1 to 4. Thus, although omitted, the above descriptions about the photographing apparatus 100 illustrated in FIGS. 1 to 4 may also be applied to the flowchart of FIG. 9.

Referring to FIG. 9, in operation 910, the photographing apparatus 100 may detect a first gesture of the user. For example, the user 10 may input a first gesture by touching the screen included in the photographing apparatus 100, and the photographing apparatus 100 may be configured to identify the first gesture. The first gesture may, for example, correspond to an operation of tapping the screen but is not limited thereto.

In operation 920, the photographing apparatus 100 may display a main image on the viewfinder. The main image may, for example, refer to a menu image including a group of functions that may be performed by the photographing apparatus 100. In other words, when the user 10 taps the screen, the photographing apparatus 100 may be configured to display the menu image on the viewfinder.

In operation 930, the photographing apparatus 100 may select a function based on a second gesture of the user. For example, when the user 10 performs a drag in various directions on the screen, the photographing apparatus 100 may be configured to select any one of the functions represented in the menu according to the direction of the drag. In this case, the photographing apparatus 100 may be configured to change the functions represented in the menu based on the drag performed by the user 10 and display the results on the viewfinder.

In operation 940, the photographing apparatus 100 may be configured to execute or perform the selected function. The executed function may, for example, include a function of setting a photographing environment, a function of adjusting the position of a focus of an image, or a function of executing an application installed in the photographing apparatus 100.

Examples of selecting a function based on a gesture of the user 10 and the photographing apparatus 100 executing the selected function will be described below with reference to FIGS. 10 to 15. However, the disclosure is not limited to the examples illustrated in FIGS. 10 to 15, and the examples of the disclosure may be applied to all functions that may be executed by the photographing apparatus 100.

Figure 10:
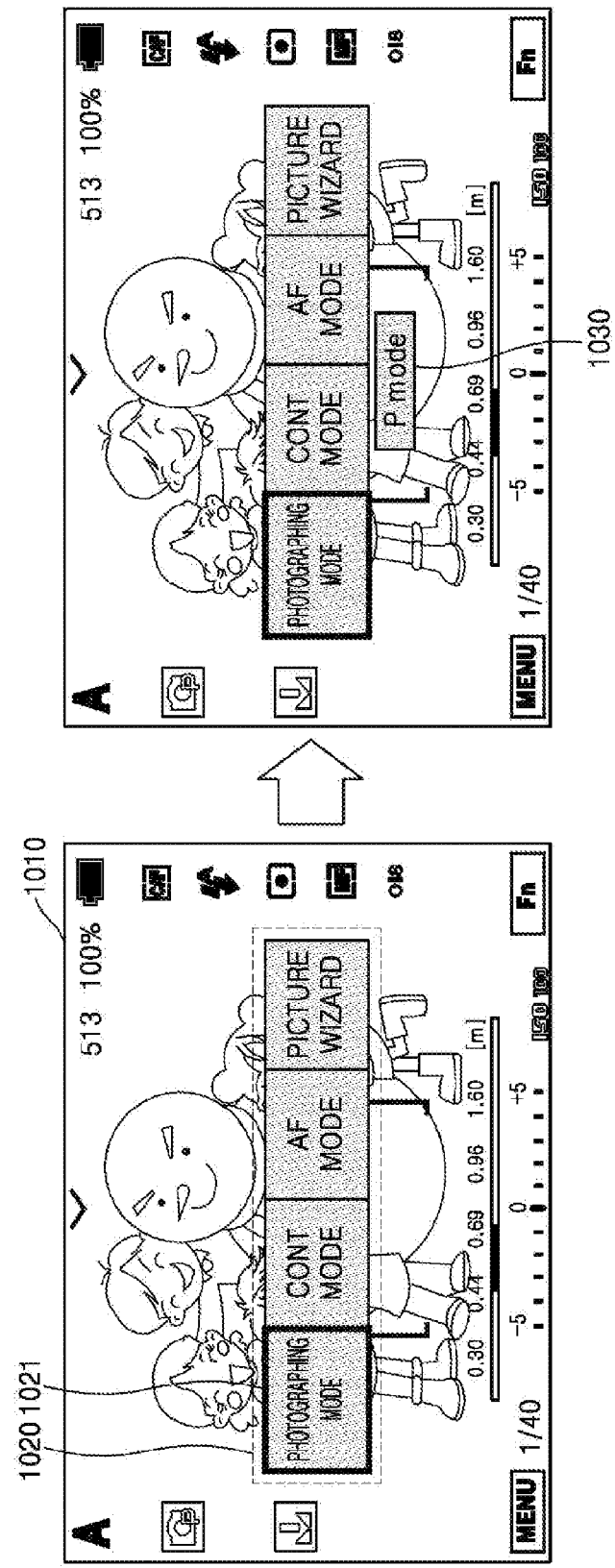
FIG. 10 is a diagram illustrating an example of a photographing apparatus executing a selected function based on a gesture.

FIG. 10 is a diagram illustrating an example of a photographing apparatus executing a selected function based on a gesture.

Referring to FIG. 10, the photographing apparatus 100 may be configured to execute or perform a photographing mode. For example, when the user 10 taps the screen while approaching the photographing apparatus 100, the photographing apparatus 100 may display a menu image 1020 including a group of functions on a viewfinder 1010. By performing a leftward or rightward drag on the screen, the user 10 may select any one 1021 of the functions represented in the menu image 1020.

When the user 10 selects the function 1021, the photographing apparatus 100 may be configured to display an image 1030 representing the sub-settings of the function 1021 on the viewfinder 1010. For example, when the user 10 selects a photographing mode 1021, the photographing apparatus 100 may display an image 1030 representing a P mode, an A mode, an S mode, and an M mode, which are the sub-modes of the photographing mode 1021, on the viewfinder 1010.

For example, the user 10 may perform an upward or downward drag on the screen, and the P mode, the A mode, the S mode, and the M mode may be sequentially displayed on the image 1030 based on the drag performed by the user 10. Thus, by tapping or double-tapping the screen, the user 10 may select the sub-mode (e.g., the P mode) displayed on the viewfinder 1010.

Thereafter, the photographing apparatus 100 may execute the sub-mode selected based on the tap or the double tap performed by the user 10.

Figure 11:
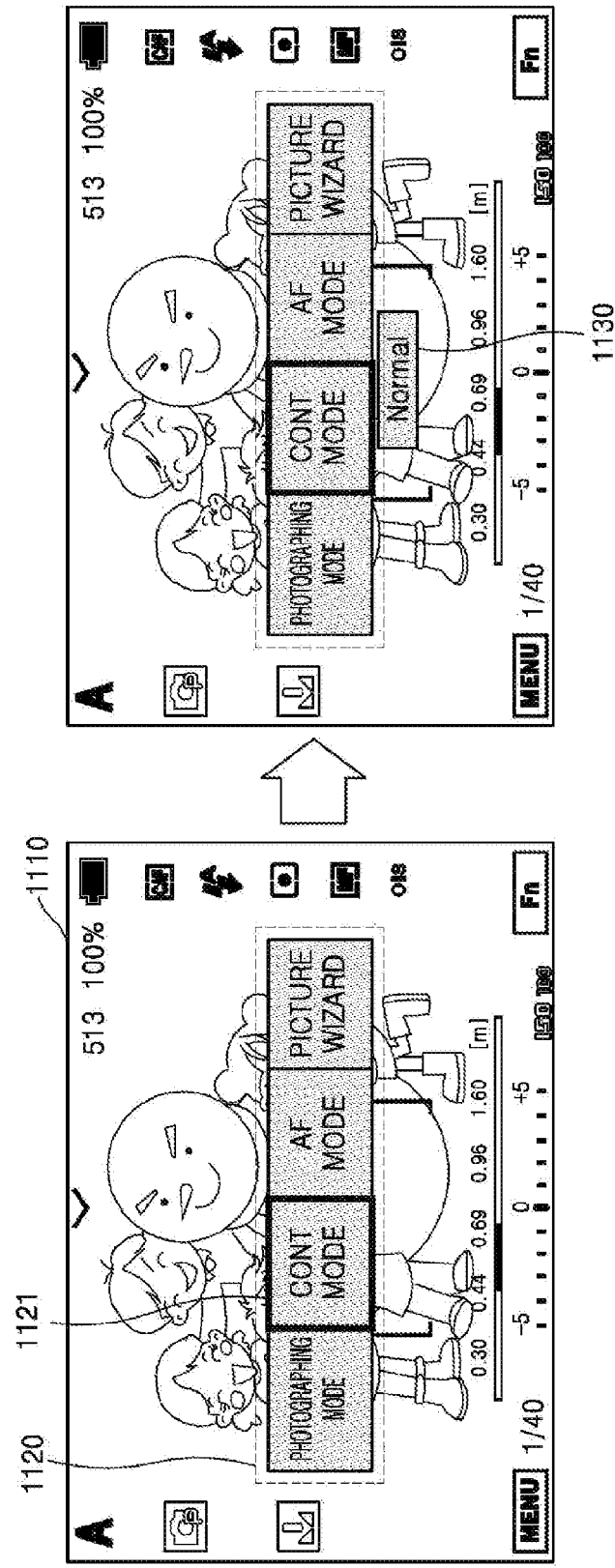
FIG. 11 is a diagram illustrating another example of a photographing apparatus executing a selected function based on a gesture.

FIG. 11 is a diagram illustrating another example of a photographing apparatus executing a selected function based on a gesture.

Referring to FIG. 11, the photographing apparatus 100 may be configured to execute or perform a continuous (Cont) mode. For example, when the user 10 taps the screen while approaching the photographing apparatus 100, the photographing apparatus 100 may display a menu image 1120 including a group of functions on a viewfinder 1110. By performing a leftward or rightward drag on the screen, the user 10 may select any one 1121 of the functions represented in the menu image 1120.

When the user 10 selects a Cont mode 1121, the photographing apparatus 100 may be configured to display an image 1130 representing the sub-settings of the Cont mode 1121 on the viewfinder 1110. For example, the photographing apparatus 100 may display an image 1130 representing a high-speed continuous (H-Cont) mode, a low-speed continuous (L-Cont) mode, and a normal continuous (Normal) mode, which are the sub-modes of the Cont mode 1121, on the viewfinder 1110.

For example, the user 10 may perform an upward or downward drag on the screen, and the H-Cont mode, the L-Cont mode, and the Normal mode (not shown) may be sequentially displayed on the image 1130 based on the drag performed by the user 10. Thus, by tapping or double-tapping the screen, the user 10 may select the sub-mode (e.g., the Normal mode) displayed on the viewfinder 1110.

Thereafter, the photographing apparatus 100 may be configured to execute or perform the sub-mode selected based on the tap or the double tap performed by the user 10.

Figure 12:
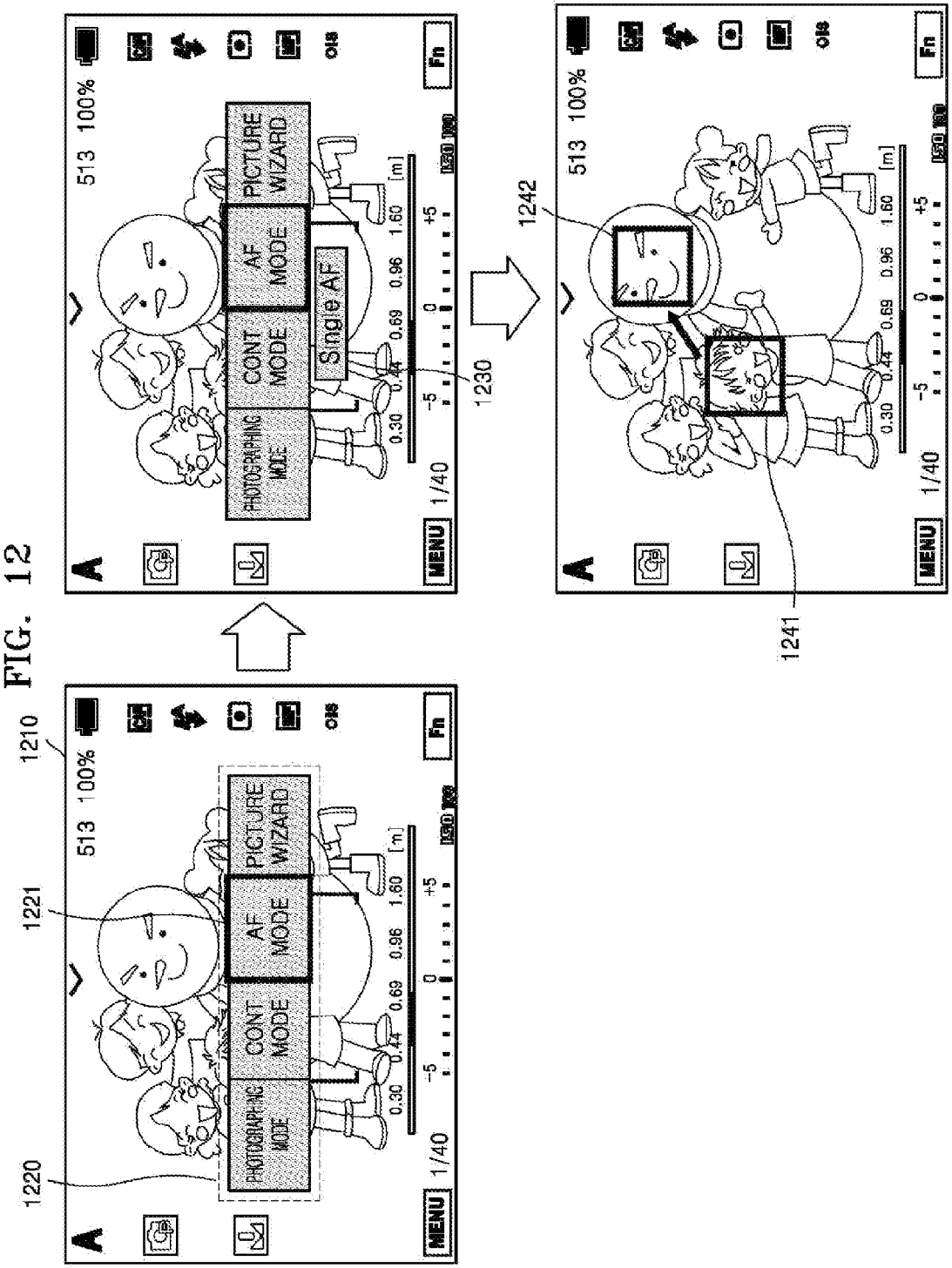
FIG. 12 is a diagram illustrating another example of a photographing apparatus executing a selected function based on a gesture.

FIG. 12 is a diagram illustrating another example of a photographing apparatus executing a selected function based on a gesture.

Referring to FIG. 12, the photographing apparatus 100 may be configured to execute or perform an auto focusing (AF) mode. For example, when the user 10 taps the screen while approaching the photographing apparatus 100, the photographing apparatus 100 may display a menu image 1220 including a group of modes on a viewfinder 1210. By performing a leftward or rightward drag on the screen, the user 10 may select any one 1221 of the modes represented in the menu image 1220.

When the user 10 selects an AF mode 1221, the photographing apparatus 100 may adjust the position of a focus of an image based on the gesture of the user. First, when the user 10 selects the AF mode 1221, the photographing apparatus 100 may display an image 1230 representing the sub-settings of the AF mode 1221 on the viewfinder 1210. For example, the photographing apparatus 100 may display an image 1230 representing a single AF mode, a continuous AF mode, an active AF mode, and a manual mode (not shown), which are the sub-modes of the AF mode 1221, on the viewfinder 1210.

For example, the user 10 may perform an upward or downward drag on the screen, and the single AF mode, the continuous AF mode, the active AF mode, and the manual mode may be sequentially displayed on the image 1230 based on the drag performed by the user 10. Thus, by tapping or double-tapping the screen, the user 10 may select the sub-mode (e.g., the single AF mode) displayed on the viewfinder 1210.

Thereafter, the photographing apparatus 100 may set a focus 1241 on the viewfinder 1210. The photographing apparatus 100 may be configured to adjust the position of the focus 1241 based on the gesture of the user 10. For example, when the user 10 selects the single AF mode, the photographing apparatus 100 may set the focus 1241 at a position in the image displayed on the viewfinder 1210. Thereafter, by performing a drag in various directions on the screen, the user 10 may change the position of the set focus 1241 into another point 1242.

Figure 13:
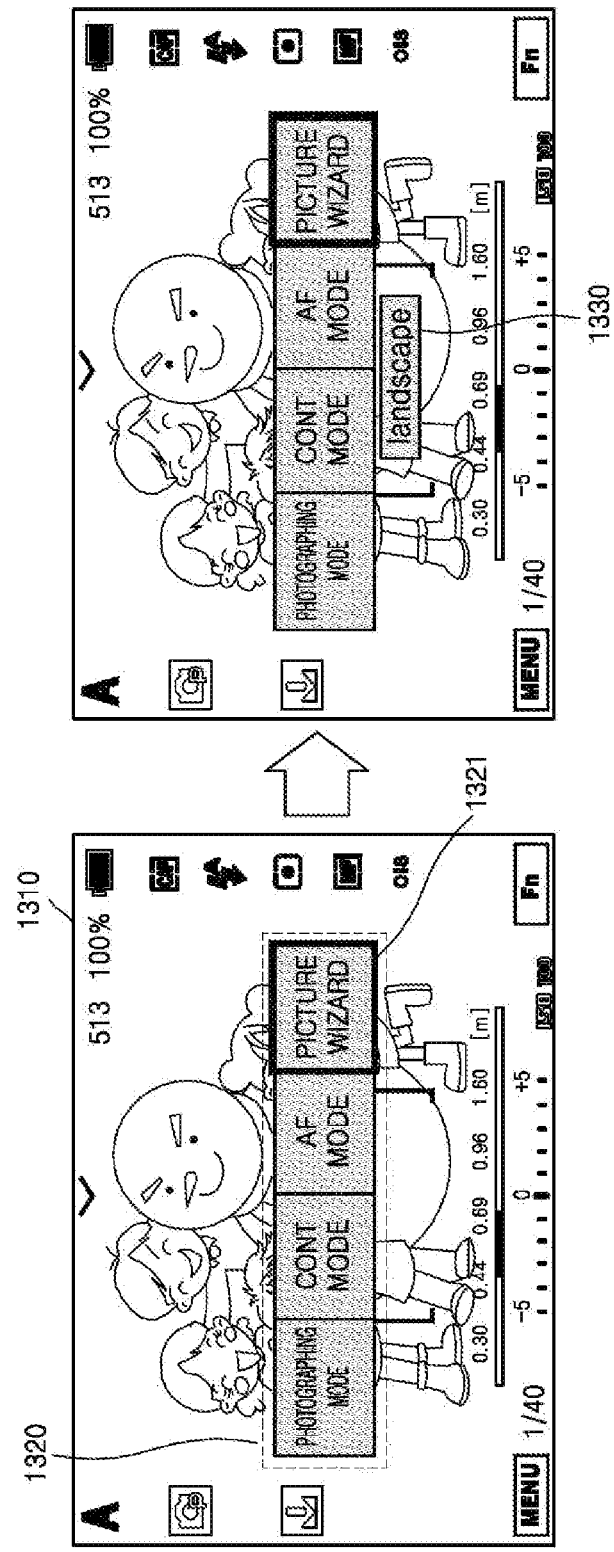
FIG. 13 is a diagram illustrating another example of a photographing apparatus executing a selected function based on a gesture.

FIG. 13 is a diagram illustrating another example of a photographing apparatus executing a selected function based on a gesture.

Referring to FIG. 13, the photographing apparatus 100 may be configured to execute or perform a picture wizard mode. The picture wizard mode illustrated in FIG. 13 may refer to a function of applying various effects to an image. In other words, the photographing apparatus 100 may apply various effects to an image by adjusting the chroma and the brightness of the image based on the concept of the picture wizard mode.

For example, when the user 10 taps the screen while approaching the photographing apparatus 100, the photographing apparatus 100 may display a menu image 1320 including a group of functions on a viewfinder 1310. By performing a leftward or rightward drag on the screen, the user 10 may select any one 1321 of the functions represented in the menu image 1320.

When the user 10 selects a picture wizard mode 1321, the photographing apparatus 100 may display an image 1330 representing the concept of the picture wizard mode 1321 on the viewfinder 1310. For example, the photographing apparatus 100 may display an image 1330 representing landscapes or characters (not shown), which are the concepts in the picture wizard mode 1321, on the viewfinder 1310.

For example, the user 10 may perform an upward or downward drag on the screen, and various concepts such as landscapes and characters may be sequentially displayed on the image 1330 based on the drag performed by the user 10. Thus, by tapping or double-tapping the screen, the user 10 may select the concept (e.g., the landscape) displayed on the viewfinder 1310.

The photographing apparatus 100 may be configured to process the image based on the concept selected based on the tap or the double tap performed by the user 10.

Figure 14:
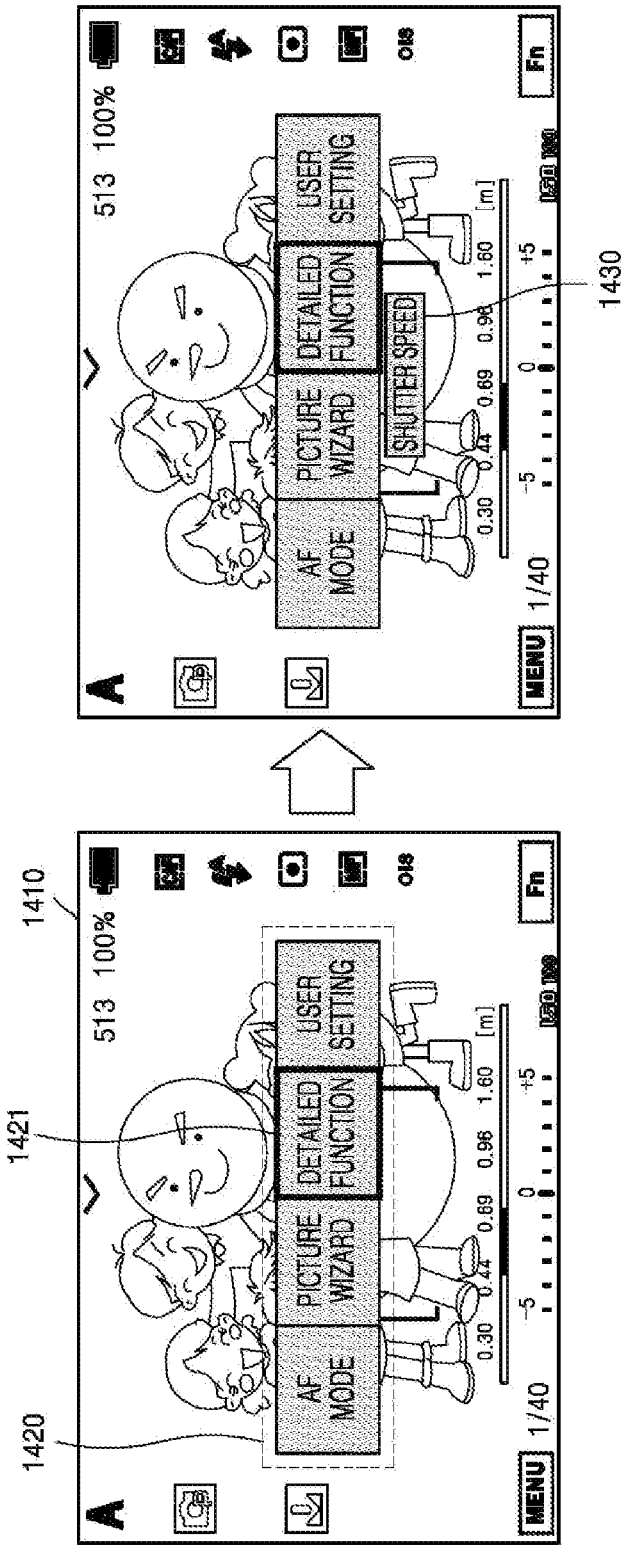
FIG. 14 is a diagram illustrating another example of a photographing apparatus executing a selected function based on a gesture.

FIG. 14 is a diagram illustrating another example of a photographing apparatus executing a selected function based on a gesture.

Referring to FIG. 14, the photographing apparatus 100 may be configured to execute or perform a detailed function. The detailed function illustrated in FIG. 14 may refer to a function for adjusting various settings (e.g., shutter speed, ISO sensitivity, aperture value, and EV) that are required by the photographing apparatus 100 to perform photographing. For example, when the user 10 taps the screen while approaching the photographing apparatus 100, the photographing apparatus 100 may display a menu image 1420 including a group of functions on a viewfinder 1410. By performing a leftward or rightward drag on the screen, the user 10 may select any one 1421 of the functions represented in the menu image 1420.

When the user 10 selects a detailed function 1421, the photographing apparatus 100 may display an image 1430 representing the sub-factors of the detailed function 1421 on the viewfinder 1410. For example, the user 10 may perform an upward or downward drag on the screen, and various factors such shutter speed, ISO sensitivity, aperture value, and EV (not shown) may be sequentially displayed on the image 1430 based on the drag performed by the user 10. Thus, by tapping or double-tapping the screen, the user 10 may select the factor (e.g., the shutter speed) displayed on the viewfinder 1410.

Thereafter, the photographing apparatus 100 may be configured to change the selected factor value (e.g., the shutter speed) based on the input of the user 10.

Figure 15:
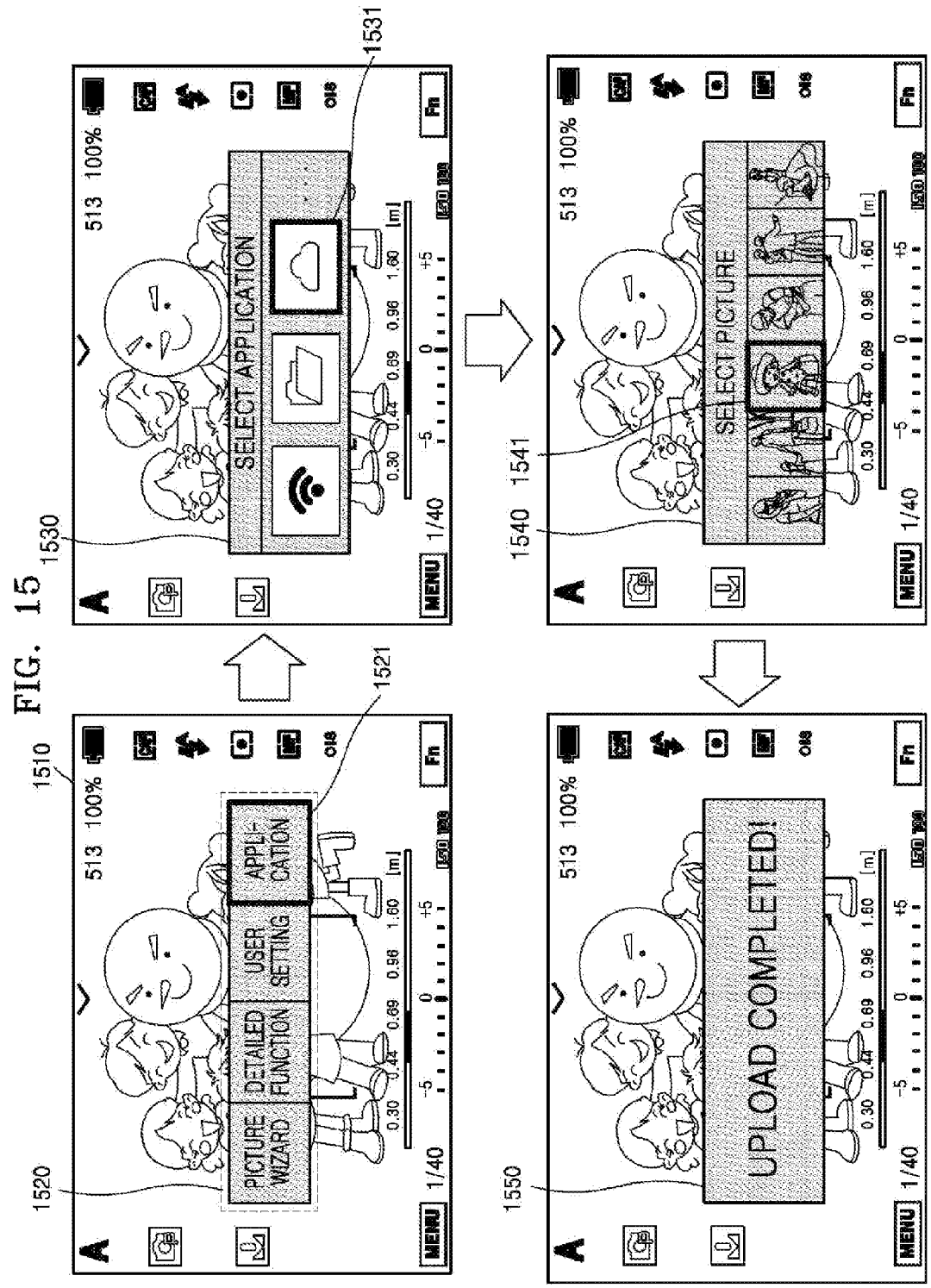
FIG. 15 is a diagram illustrating another example of a photographing apparatus executing a selected function based on a gesture.

FIG. 15 is a diagram illustrating another example of a photographing apparatus executing a selected function based on a gesture.

Referring to FIG. 15, the photographing apparatus 100 may be configured to execute an application. The application may refer to a function of executing any one of the applications installed in the photographing apparatus 100.

For example, when the user 10 taps the screen while approaching the photographing apparatus 100, the photographing apparatus 100 may display a menu image 1520 including a group of functions on a viewfinder 1510. By performing a leftward or rightward drag on the screen, the user 10 may select any one 1521 of the functions represented in the menu image 1520.

When the user 10 selects an application 1521, the photographing apparatus 100 may display a list 1530 of applications installed in the photographing apparatus 100 on the viewfinder 1510.

For example, the user 10 may perform a drag in various directions on the screen, and any one 1531 of the applications represented in the list may be selected according to the drag of the user 10. Thereafter, the photographing apparatus 10 may be configured to execute an application selected based on the tap or the double tap performed by the user 10. It is assumed for the purposes of the description below that an application 1531 is executed to upload pictures to a server.

When the application 1531 is executed, the photographing apparatus 100 may display thumbnails 1540 of the pre-stored images on the viewfinder 1510. The user 10 may perform a drag in various directions on the screen, and any one 1541 of the thumbnails 1540 may be selected based on the drag performed by the user 10.

The photographing apparatus 100 may upload an image corresponding to the selected thumbnail 1541 to the server and display an image 1550 indicating the completion of the upload on the viewfinder 1510.

As described above with reference to FIGS. 10 to 15, the photographing apparatus 100 may be configured to display a menu on the viewfinder and to execute or perform a function selected from the menu based on a gesture of the user.

On the other hand, the photographing apparatus 100 may pre-set a function corresponding to each gesture based on a user input. As an example, the photographing apparatus 100 may immediately execute a pre-set function based on an input gesture without displaying a menu on the viewfinder. An example of setting a function corresponding to a gesture by the photographing apparatus 100 will be described below with reference to FIGS. 16 and 17.

Figure 16:
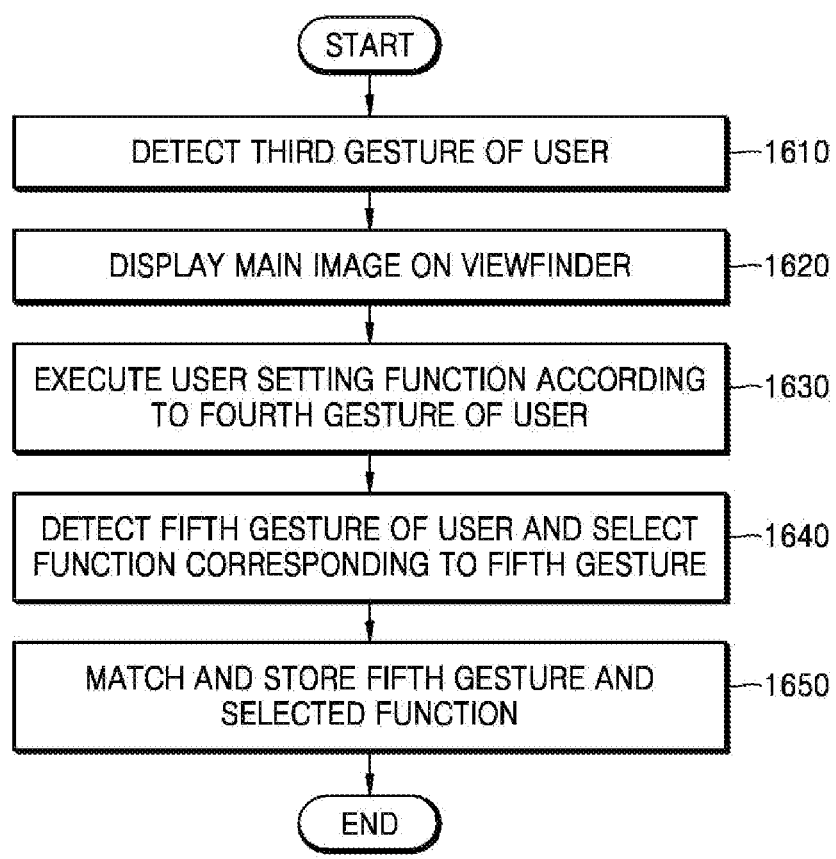
FIG. 16 is a flowchart illustrating an example of a photographing apparatus setting a function corresponding to a gesture.

FIG. 16 is a flowchart illustrating an example of a photographing apparatus setting a function corresponding to a gesture.

The flowchart illustrated in FIG. 16 may include sequential operations that are sequentially processed in the photographing apparatus 100 illustrated in FIGS. 1 to 4. Thus, although omitted, the above descriptions about the photographing apparatus 100 illustrated in FIGS. 1 to 4 may also be applied to the flowchart of FIG. 16.

Referring to FIG. 16, in operation 1610, the photographing apparatus 100 may detect a third gesture of the user. For example, the user 10 may input a third gesture by touching the screen included in the photographing apparatus 100, and the photographing apparatus 100 may be configured to identify the third gesture. The third gesture may, for example, correspond to an operation of tapping the screen but is not limited thereto.

In operation 1620, the photographing apparatus 100 may display a main image on the viewfinder. The main image may, for example, refer to a menu image including a group of functions that may be performed by the photographing apparatus 100. In other words, when the user 10 taps the screen, the photographing apparatus 100 may display the menu image on the viewfinder.

In operation 1630, the photographing apparatus 100 may be configured to execute or perform a user setting function according to a fourth gesture of the user. For example, when the user 10 inputs a gesture for selecting the user setting function among the functions included in the menu image, the photographing apparatus 100 may execute the user setting function.

In operation 1640, the photographing apparatus 100 may detect a fifth gesture of the user and select a function corresponding to the fifth gesture. For example, the photographing apparatus 100 may be configured to request the user to input a gesture and to select a function corresponding to the input gesture.

In operation 1650, the photographing apparatus 100 may match and store the fifth gesture and the function selected in operation 1640.

An example of setting a function corresponding to a gesture by the photographing apparatus 100 will be described below with reference to FIG. 17.

Figure 17:
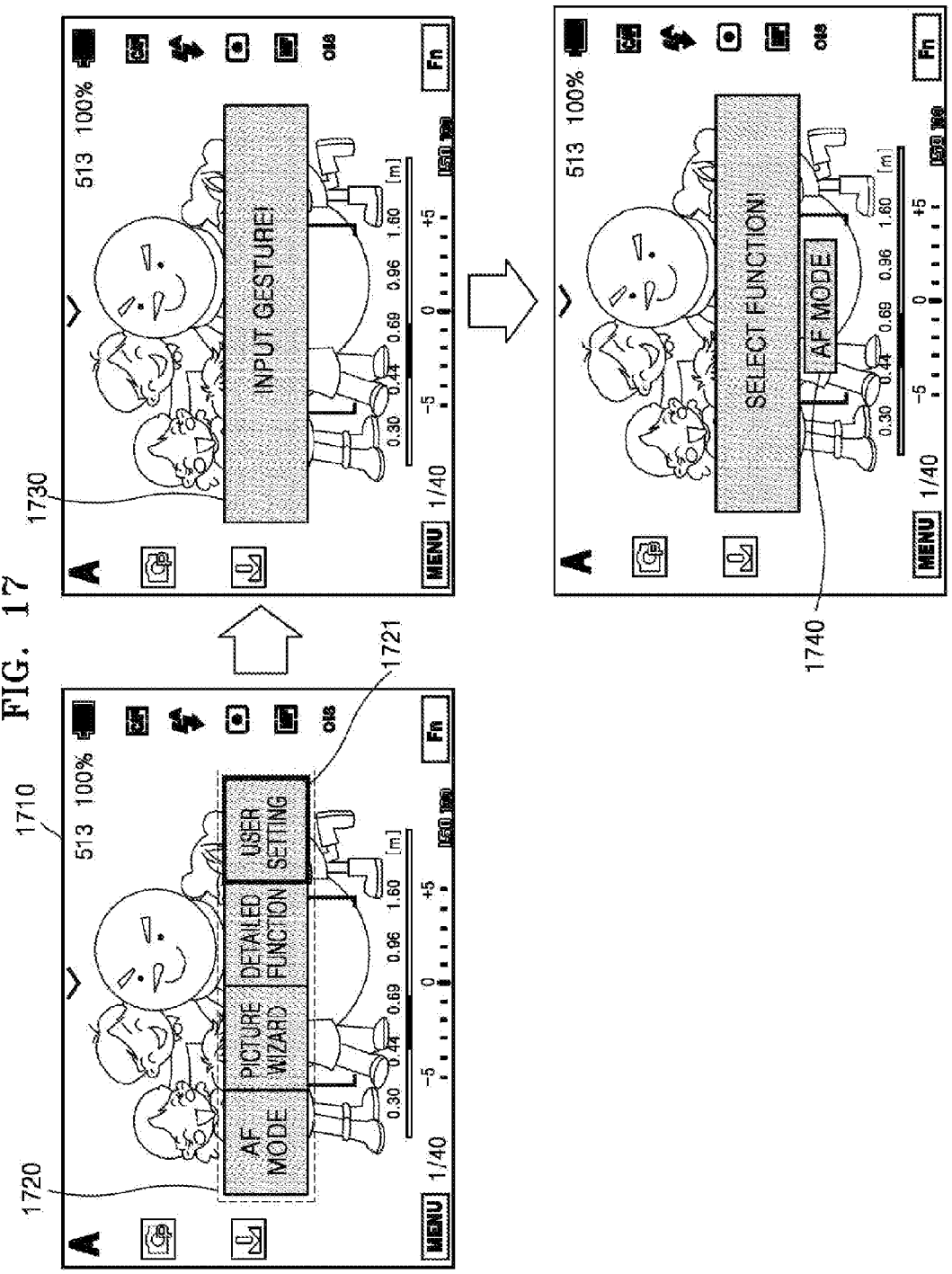
FIG. 17 is a diagram illustrating an example of a photographing apparatus setting a function corresponding to a gesture.

FIG. 17 is a diagram illustrating an example of a photographing apparatus setting a function corresponding to a gesture.

Referring to FIG. 17, when the user 10 taps the screen while approaching the photographing apparatus 100, the photographing apparatus 100 may display a menu image 1720 including a group of functions on a viewfinder 1710.

By performing a leftward or rightward drag on the screen, the user 10 may select a user setting function 1721 from among the functions represented in the menu image 1720.

When the user setting function 1721 is selected, the photographing apparatus 100 may request the user 10 to input a gesture. For example, the photographing apparatus 100 may display an image 1730 for requesting the input of a gesture on the viewfinder 1710, and may wait for a predetermined time. When a gesture is not input for the predetermined time, the photographing apparatus 100 may re-request the user 10 to input a gesture or re-display the menu image 1720 on the viewfinder 1710.

When the user 10 inputs a gesture on the screen, the photographing apparatus 100 may identify the input gesture. Then, the photographing apparatus 100 may request the user 10 to select a function. For example, based on the drag performed by the user 10, the photographing apparatus 100 may sequentially display all functions, which may be performed by the photographing apparatus 100, on the viewfinder 1710. Thus, by tapping or double-tapping the screen, the user 10 may select a function 1740 displayed on the viewfinder 1710.

When the user 10 selects a function, the photographing apparatus 100 may be configured to match and store the gesture and the function. Thereafter, when the user 10 performs a gesture, the photographing apparatus 100 may immediately execute a stored function matched to the gesture.

As described above with reference to FIGS. 9 to 17, the user 10 may input a gesture through the screen displaying an image representing the state of the photographing apparatus 100. Also, the user 10 may input a gesture through the screen displaying a live view image. Also, the user 10 may select a function, which will be performed by the photographing apparatus 100, by using the wheel provided in the photographing apparatus 100.

Examples of the user 10 selecting a function, which will be performed by the photographing apparatus 100, by operating different components provided in the photographing apparatus 100 will be described below with reference to FIGS. 18 and 19.

Figure 18:
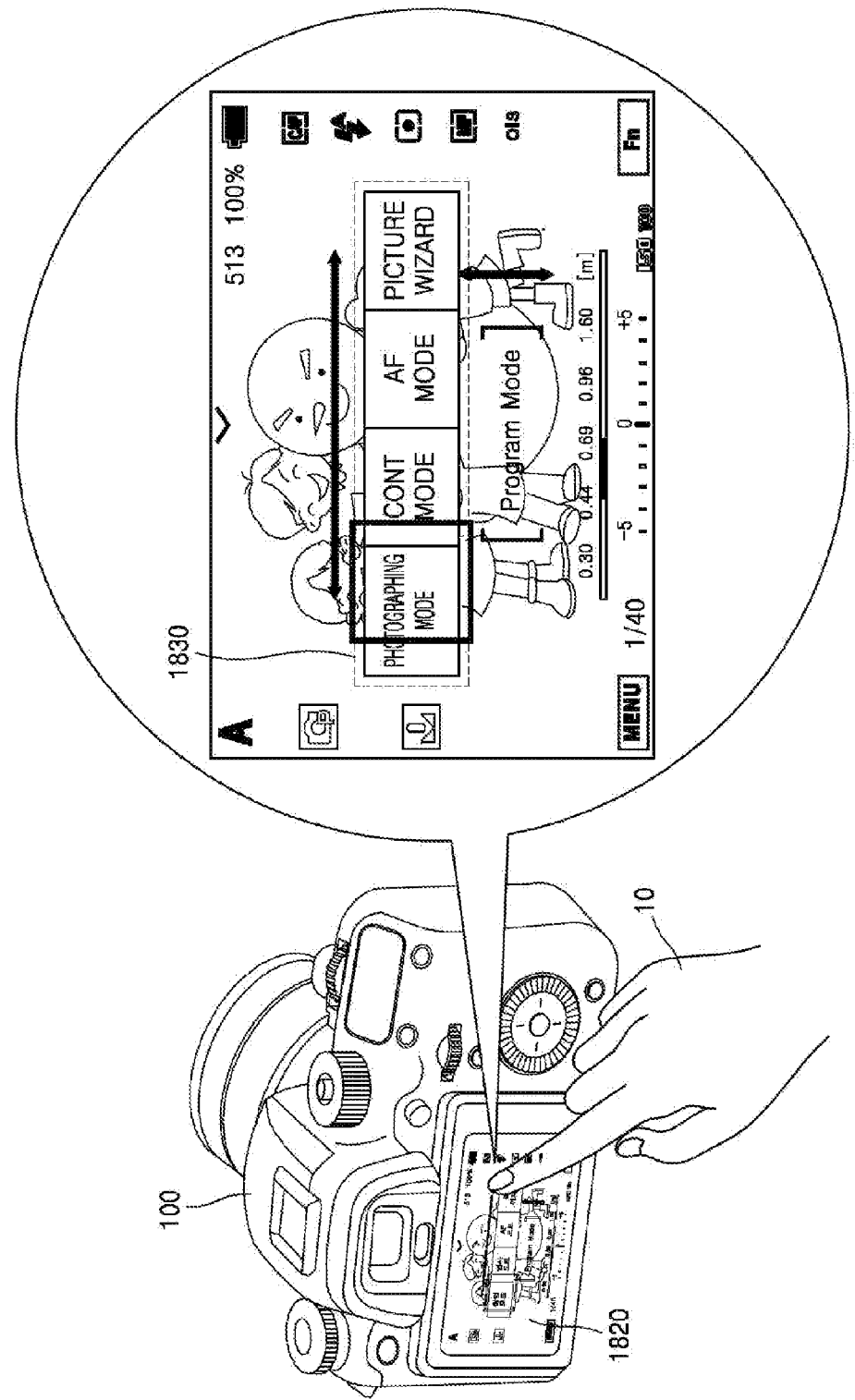
FIG. 18 is a diagram illustrating an example of the user inputting a gesture through a screen displaying a live view image.

FIG. 18 is a diagram illustrating an example of inputting a gesture through a screen displaying a live view image.

Referring to FIG. 18, when the user 10 approaches the photographing apparatus 100, the photographing apparatus 100 enables a function of a screen 1810 to detect a gesture of the user 10. When the user 10 taps the screen 1810 while approaching the photographing apparatus 100, the photographing apparatus 100 may display a menu image 1830 including a group of functions, which may be performed by the photographing apparatus 100, on a screen 1820 displaying a live view image.

The user 10 may select any one of the functions by inputting a gesture on the screen 1820 with reference to the menu image 1830 displayed on the screen 1820. As an example, like the screen 1810, the screen 1820 may function as a touchscreen. Thus, the user 10 may input a gesture by using the screen 1810 or the screen 1820 selectively.

In this case, an example of the user 10 selecting the function based on the gesture input through the screen 1820 and the photographing apparatus 100 executing the selected function may be the same as described above with reference to FIGS. 10 to 17.

Figure 19:
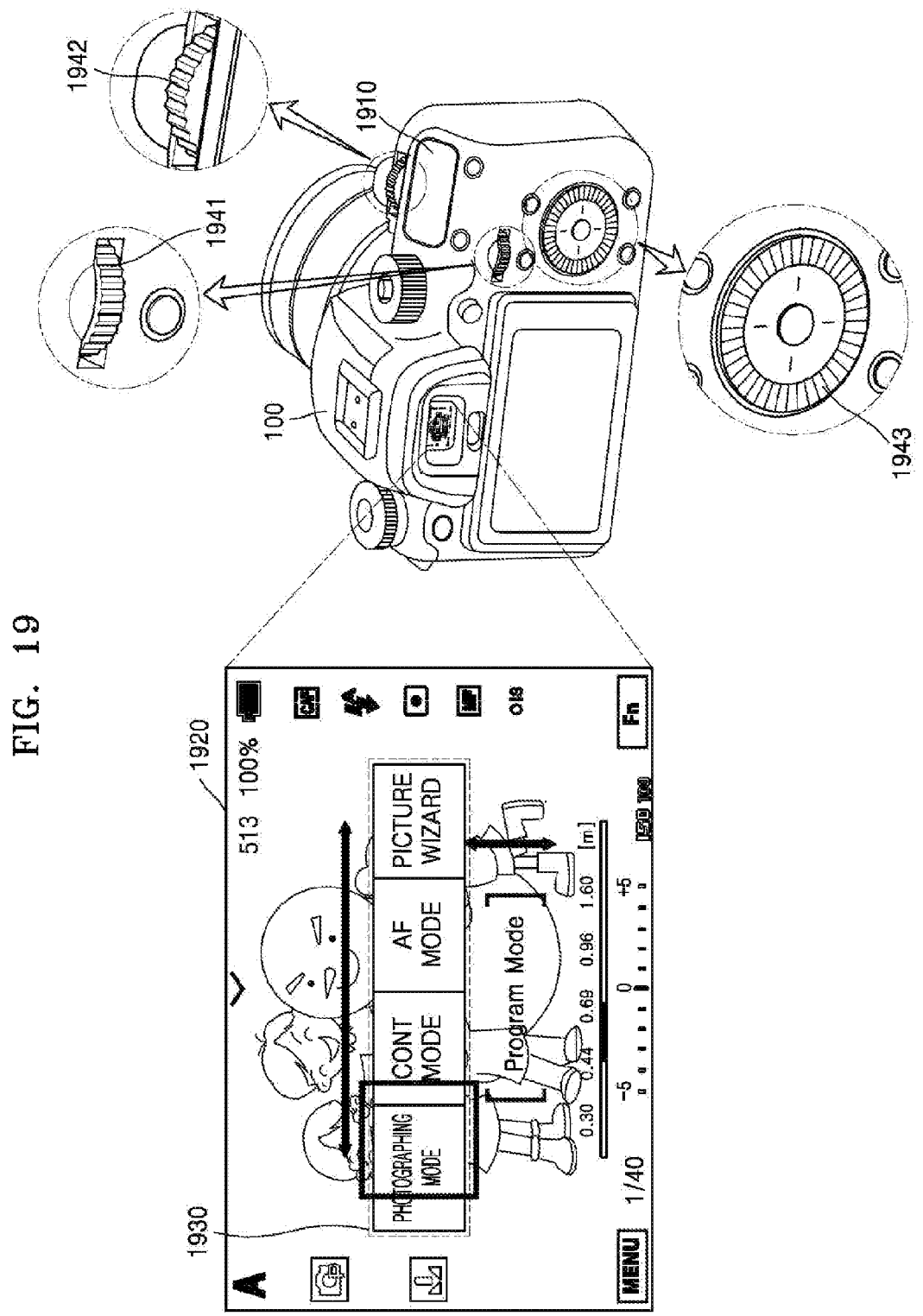
FIG. 19 is a diagram illustrating an example of the user selecting a function by operating a wheel provided in a photographing apparatus.

FIG. 19 is a diagram illustrating an example of the user selecting a function through a wheel provided in a photographing apparatus.

Referring to FIG. 19, when the user 10 approaches the photographing apparatus 100, the photographing apparatus 100 enables a function of detecting a gesture of the user by a screen 1910. When the user 10 taps the screen 1910 while approaching the photographing apparatus 100, the photographing apparatus 100 may display a menu image 1930 including a group of functions, which may be performed by the photographing apparatus 100, on a viewfinder 1920.

On the other hand, the user 10 may select a function, which will be performed by the photographing apparatus 100, by operating wheels 1941, 1942, and 1943 included in the photographing apparatus 100 without performing a gesture on the screen 1910. As an example, the user 10 may select any one of the functions included in the menu image 1930 by operating the wheels 1941, 1942, and 1943, and the photographing apparatus 100 may execute the selected function. In this case, an example of selecting the function by the user 10 by operating the wheels 1941, 1942, and 1943 and executing the selected function by the photographing apparatus 100 may be the same as described above with reference to FIGS. 10 to 17.

Figure 20:
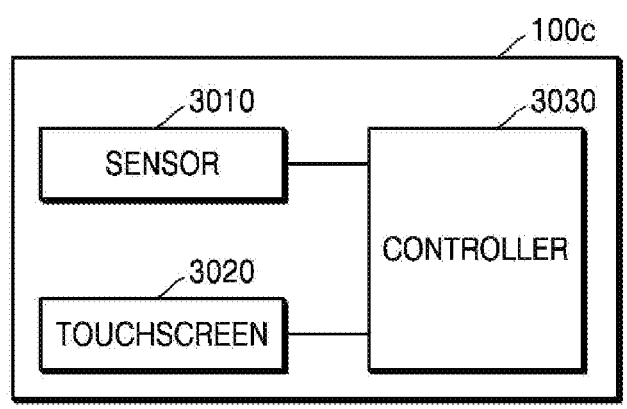
FIG. 20 is a block diagram illustrating another example of a photographing apparatus.

FIG. 20 is a block diagram illustrating another example of a photographing apparatus.

Referring to FIG. 20, a photographing apparatus 100c may include a sensor 3010, a touchscreen 3020, and a controller 3030. Only components necessary for implementing some examples are included in the photographing apparatus 100c of FIG. 20. Thus, according to the examples, the photographing apparatus 100c may further include the components included in the photographing apparatuses 100a and 100b illustrated in FIGS. 2 and 3. Also, the following descriptions about the photographing apparatus 100c may also be applied to the photographing apparatuses 100a and 100b illustrated in FIGS. 2 and 3. Also, although omitted, the above descriptions made with reference to FIGS. 1 to 19 may also be applied to the photographing apparatus 100c of FIG. 20.

The sensor 3010 may detect the approach of the user to the photographing apparatus 100c. The sensor 3010 may include a proximity sensor but is not limited thereto. The photographing apparatus 100c may detect the approach of the user 10 to the photographing apparatus 100c through the sensor 3010. The approach of the user 10 to the photographing apparatus 100c may refer to, but is not limited to, the case where the user 10 views the target object through the viewfinder.

The touchscreen 3020 may display an image representing the state of the photographing apparatus 100c and receive a gesture of the user 10. For example, when the user 10 approaches the photographing apparatus 100c, a function of the touchscreen 3020 to detect a gesture may be enabled. The image representing the state of the photographing apparatus 100c may refer to information about a currently-set function of the photographing apparatus 100c or information representing the state of a battery of the photographing apparatus 100c. For example, the touchscreen 3020 may display information about a set ISO sensitivity of the photographing apparatus 100c, a set aperture value, and a remaining battery level.

The controller 3030 may be configured to enable a function of the touchscreen 3020 to detect a gesture based on a signal received from the sensor 3010. Then, the controller 3030 may be configured to execute a function corresponding to the gesture of the user 10. For example, the controller 3030 may be configured to enable the function of the touchscreen 3020 to detect a gesture only when the user 10 approaches the photographing apparatus 100c. The controller 3030 may be configured to execute a function selected based on the gesture of the user 10.

For example, the user 10 may perform various gestures by touching the touchscreen 3020, and the photographing apparatus 100c may be configured to identify the gesture of the user 10. Then, the photographing apparatus 100c may be configured to execute a function selected according to the gesture of the user 10.

As described above, even while viewing the target object through the viewfinder, the user may select a function of the photographing apparatus or set details of the selected function. Thus, the user may easily perform a photographing operation based on the viewfinder.

The above method of the disclosure may be written as a computer program and may be implemented in computer that executes the program using a non-transitory computer-readable recording medium. Also, the data structure used in the above example method may be recorded in a non-transitory computer-readable recording medium through various means. Examples of the non-transitory computer-readable recording medium include recording media such as magnetic storage media (e.g., ROMs, RAMs, USBs, floppy disks, hard disks, etc.) and optical recording media (e.g., CD-ROMs, DVDs, etc.).

Also, the above method may be performed by executing the instructions included in at least one of the programs stored in a non-transitory computer-readable recording medium. When the instructions are executed by a computer, the computer may perform a function corresponding to the instructions. The instructions may include machine language codes that may be generated by a compiler, and high-level language codes that may be executed by a computer by using an interpreter. A processor may be an example of the computer, and a memory may be an example of the non-transitory computer-readable recording medium.

Those of ordinary skill in the art will understand that various changes in form and details may be made in the examples without departing from the spirit and scope of the disclosure as defined by the appended claims. Thus, the examples should be considered in a descriptive or illustrative sense only and not for purposes of limitation. Therefore, the scope of the disclosure is defined not by the detailed description but by the appended claims, and all differences within the scope will be construed as being included in the scope of the disclosure.

Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

What is claimed is:

1. A photographing apparatus comprising:
    a sensor configured to detect a proximity of a user to the photographing apparatus;
    a touchscreen configured to display an image representing a state of the photographing apparatus and to receive a gesture;
    a controller configured to enable a function of the touchscreen to detect the gesture based on a signal received from the sensor, and to perform a function corresponding to the gesture;
    wherein a viewfinder of the photographing apparatus is configured to simultaneously display both an image to be photographed and a menu of items that can be selected via gestures received by the touchscreen; and wherein the touchscreen is at least partially located on a top side of the photographing apparatus.

2. The photographing apparatus of claim 1, wherein the controller is configured to enable the function of detecting the gesture based on the signal received from the sensor while the image representing the state of the photographing apparatus is displayed.

3. The photographing apparatus of claim 1, wherein the sensor is configured to detect whether the user is within a predetermined proximity the viewfinder.

4. The photographing apparatus of claim 2, wherein the controller is configured to display an image representing a function performed by the photographing apparatus on the viewfinder.

5. The photographing apparatus of claim 1, wherein the controller is configured to set the function corresponding to the gesture based on receiving a user input.

6. The photographing apparatus of claim 1, wherein the function corresponding to the gesture comprises setting a photographing environment.

7. The photographing apparatus of claim 1, wherein the function corresponding to the gesture comprises adjusting a position of a focus of an image.

8. The photographing apparatus of claim 1, wherein the function corresponding to the gesture comprises executing an application installed in the photographing apparatus.

9. The photographing apparatus of claim 1, wherein the image representing the state of the photographing apparatus includes at least one of: information about a currently-set function and information representing a state of a battery.

10. A method of controlling a photographing apparatus, comprising:

determining whether a user is within a predetermined proximity of the photographing apparatus;

enabling a function of detecting a gesture via a touchscreen when the user is within a predetermined proximity of the photographing apparatus;

executing a function corresponding to the gesture when the gesture is detected;

wherein a viewfinder of the photographing apparatus simultaneously displays both an image to be photographed and a menu of items that can be selected via gestures; and wherein the touchscreen is at least partially located on a top side of the photographing apparatus.

11. The method of claim 10, further comprising displaying an image representing a state of the photographing apparatus, wherein determining whether the user is within a predetermined proximity of the photographing apparatus comprises determining whether the user is within a predetermined proximity of the photographing apparatus while the image is displayed.

12. The method of claim 10, wherein determining whether the user is within a predetermined proximity of the photographing apparatus comprises determining whether the user is within a predetermined proximity of the viewfinder included in the photographing apparatus.

13. The method of claim 12, further comprising displaying an image representing a function performed by the photographing apparatus on the viewfinder.

14. The method of claim 10, further comprising setting the function corresponding to the gesture based on receiving a user input.

15. The method of claim 10, wherein the function corresponding to the gesture comprises setting a photographing environment.

16. The method of claim 10, wherein the function corresponding to the gesture comprises adjusting a position of a focus of an image.

17. The method of claim 10, wherein the function corresponding to the gesture comprises executing an application installed in the photographing apparatus.

18. The method of claim 11, wherein the image representing the state of the photographing apparatus includes at least one of: information about a currently-set function and information representing a state of a battery.

19. A non-transitory computer-readable recording medium that stores a program that performs the method of claim 10 when executed by a computer.

* * * * *